(12) United States Patent
Richardson

(10) Patent No.: US 10,040,018 B2
(45) Date of Patent: Aug. 7, 2018

(54) FLUID FILTERS AND METHODS OF USE

(71) Applicant: IMAGINE TF, LLC, Los Gatos, CA (US)

(72) Inventor: Brian E. Richardson, Los Gatos, CA (US)

(73) Assignee: IMAGINE TF, LLC, Los Gatos, CA (US)

(*) Notice: Subject to any disclaimer, the term of this patent is extended or adjusted under 35 U.S.C. 154(b) by 182 days.

(21) Appl. No.: 14/149,620

(22) Filed: Jan. 7, 2014

(65) Prior Publication Data
US 2014/0224658 A1    Aug. 14, 2014

Related U.S. Application Data

(60) Provisional application No. 61/848,671, filed on Jan. 9, 2013, provisional application No. 61/849,098, filed on Jan. 17, 2013, provisional application No. 61/851,987, filed on Mar. 14, 2013.

(51) Int. Cl.
*B01D 46/40* (2006.01)

(52) U.S. Cl.
CPC .................... *B01D 46/40* (2013.01)

(58) Field of Classification Search
None
See application file for complete search history.

(56) References Cited

U.S. PATENT DOCUMENTS

| 1,977,174 A | 10/1934 | Crawford |
| 3,250,396 A | 5/1966 | Armstrong et al. |
| 3,335,946 A | 8/1967 | Putterlik |
| 3,884,805 A | 5/1975 | Bagdasarian et al. |
| 3,948,779 A | 4/1976 | Jackson |
| 4,267,045 A | 5/1981 | Hoof |

(Continued)

FOREIGN PATENT DOCUMENTS

| CN | 201094877 | 8/2008 |
| CN | 203139755 U | 8/2013 |

(Continued)

OTHER PUBLICATIONS

International Search Report and Written Opinion dated Aug. 28, 2014 in Application No. PCT/US2014/036439, filed May 1, 2014.

(Continued)

*Primary Examiner* — Benjamin M Kurtz
(74) *Attorney, Agent, or Firm* — AMPACC Law Group, LLP; Keith Kline

(57) ABSTRACT

Multiple staged filters are provided herein. A filter may include a plurality of panels that each include a filtering front surface and a flat back surface, the filtering front surface having a first row of vertically extending protrusions spaced apart from one another to form vertical channels, a second row of vertically extending protrusions spaced apart from one another to form vertical channels, and one or more rows of filtering protrusions, where the one or more rows are vertically spaced apart from one another and extending between the first and second rows of vertically extending protrusions. Further, each row of filtering protrusions may include filtering protrusions that are spaced from one another to form filter channels having a size that is configured to receive and retain objects of a given size.

15 Claims, 29 Drawing Sheets

(56) References Cited

U.S. PATENT DOCUMENTS

| | | | |
|---|---|---|---|
| 4,410,430 A | 10/1983 | Hagler, Jr. |
| 4,423,090 A | 12/1983 | Hammond, Jr. et al. |
| 4,430,232 A | 2/1984 | Doucet |
| 4,478,769 A | 10/1984 | Pricone et al. |
| 4,486,363 A | 12/1984 | Pricone et al. |
| 4,601,861 A | 7/1986 | Pricone et al. |
| 4,620,917 A | 11/1986 | Nozawa et al. |
| 4,668,558 A | 5/1987 | Barber |
| 4,797,175 A | 1/1989 | Ellion et al. |
| 4,842,739 A | 6/1989 | Tang |
| 4,842,794 A | 6/1989 | Hovis et al. |
| 4,891,120 A | 1/1990 | Sethi et al. |
| 4,902,420 A | 2/1990 | Pall et al. |
| 4,960,449 A | 10/1990 | Yonushonis |
| 4,971,769 A | 11/1990 | Haerle |
| 5,009,857 A | 4/1991 | Haerle |
| 5,100,551 A | 3/1992 | Pall et al. |
| 5,200,073 A | 4/1993 | Steere et al. |
| 5,204,690 A | 4/1993 | Lorenze, Jr. et al. |
| 5,207,962 A | 5/1993 | Hovis et al. |
| 5,262,107 A | 11/1993 | Hovis et al. |
| 5,290,447 A | 3/1994 | Lippold |
| 5,505,852 A | 4/1996 | van Rossen |
| 5,552,046 A | 9/1996 | Johnston et al. |
| 5,568,819 A | 10/1996 | Gentry et al. |
| 5,645,704 A | 7/1997 | Axtman |
| 5,985,164 A | 11/1999 | Chu et al. |
| 6,273,938 B1 | 8/2001 | Fanselow et al. |
| 6,274,035 B1 | 8/2001 | Yuan et al. |
| 6,284,072 B1 | 9/2001 | Ryan et al. |
| 6,306,300 B1 | 10/2001 | Harding et al. |
| 6,346,192 B2 | 2/2002 | Buhr et al. |
| 6,375,870 B1 | 4/2002 | Visovsky et al. |
| 6,391,097 B1 | 5/2002 | Rosenberg |
| 6,471,746 B2 | 10/2002 | Hagglund et al. |
| 6,524,488 B1* | 2/2003 | Insley ............... B01D 39/1692 210/483 |
| 6,589,317 B2 | 7/2003 | Zhang et al. |
| 6,632,357 B1 | 10/2003 | Barger et al. |
| 6,685,833 B2 | 2/2004 | Lippold |
| 6,685,841 B2 | 2/2004 | Lopez et al. |
| 6,746,890 B2 | 6/2004 | Gupta et al. |
| 6,748,978 B2 | 6/2004 | Pezzuto et al. |
| 6,752,889 B2 | 6/2004 | Insley et al. |
| 6,761,962 B2 | 7/2004 | Bentsen et al. |
| 6,827,906 B1 | 12/2004 | Bjornson et al. |
| 6,872,302 B2 | 3/2005 | Aste |
| 6,915,566 B2 | 7/2005 | Abbott et al. |
| 6,936,086 B2 | 8/2005 | Harkonen et al. |
| 7,032,426 B2 | 4/2006 | Durney et al. |
| 7,048,848 B2 | 5/2006 | Assion |
| 7,081,208 B2 | 7/2006 | McCullough et al. |
| 7,104,406 B2 | 9/2006 | Chen et al. |
| 7,122,068 B2 | 10/2006 | Tate et al. |
| 7,163,733 B2 | 1/2007 | Bourdelais et al. |
| 7,217,562 B2 | 5/2007 | Cao et al. |
| 7,223,364 B1 | 5/2007 | Johnston et al. |
| 7,238,255 B2 | 7/2007 | Derand et al. |
| 7,282,148 B2 | 10/2007 | Dalton et al. |
| 7,323,105 B1 | 1/2008 | Janikowski et al. |
| 7,425,227 B1 | 9/2008 | Hutchison et al. |
| 7,442,303 B2 | 10/2008 | Jacobson |
| 7,531,120 B2 | 5/2009 | Van Rijn et al. |
| 7,569,139 B2 | 8/2009 | Mihlbauer et al. |
| 7,588,619 B2 | 9/2009 | Chilton et al. |
| 7,645,383 B2 | 1/2010 | Kadel et al. |
| 7,784,619 B2 | 8/2010 | Jacobson |
| 7,857,978 B2 | 12/2010 | Jensen et al. |
| 7,901,758 B2 | 3/2011 | Rasmussen |
| 7,922,795 B2 | 4/2011 | Striemer et al. |
| 7,959,780 B2 | 6/2011 | Hawkins et al. |
| 7,988,840 B2 | 8/2011 | Huang et al. |
| 8,025,854 B2 | 9/2011 | Ohman et al. |
| 8,083,941 B2* | 12/2011 | Chien ............... B01D 29/111 210/314 |
| 8,179,381 B2 | 5/2012 | Frey et al. |
| 8,186,913 B2 | 5/2012 | Toner et al. |
| 8,197,775 B2 | 6/2012 | Johnston et al. |
| 8,273,245 B2 | 9/2012 | Jovanovic et al. |
| 8,277,759 B2 | 10/2012 | Sundberg et al. |
| 8,282,799 B2 | 10/2012 | Huang et al. |
| 8,297,449 B2 | 10/2012 | Afzali-Ardakani et al. |
| 8,304,230 B2 | 11/2012 | Toner et al. |
| 8,328,022 B2 | 12/2012 | Mbadinga-Mouanda et al. |
| 8,679,336 B2 | 3/2014 | Hongo et al. |
| 2002/0060183 A1 | 5/2002 | Paul et al. |
| 2002/0125192 A1 | 9/2002 | Lopez et al. |
| 2002/0185003 A1 | 12/2002 | Potter |
| 2003/0104170 A1 | 6/2003 | Johnston et al. |
| 2003/0118781 A1 | 6/2003 | Insley et al. |
| 2004/0159319 A1 | 8/2004 | Kadel et al. |
| 2005/0179150 A1 | 8/2005 | Bharadwaj et al. |
| 2006/0219627 A1 | 10/2006 | Rodgers et al. |
| 2007/0020772 A1 | 1/2007 | Cao et al. |
| 2007/0151920 A1 | 7/2007 | Kay |
| 2007/0246433 A1 | 10/2007 | Zuberi |
| 2007/0251867 A1 | 11/2007 | Mihlbauer et al. |
| 2008/0012151 A1 | 1/2008 | Kemppainen et al. |
| 2008/0014410 A1 | 1/2008 | Johnston et al. |
| 2008/0296238 A1 | 12/2008 | Haldopoulos et al. |
| 2009/0102094 A1 | 4/2009 | Golden et al. |
| 2009/0120874 A1 | 5/2009 | Jensen et al. |
| 2009/0149345 A1 | 6/2009 | Nishi et al. |
| 2010/0028604 A1 | 2/2010 | Bhushan et al. |
| 2010/0216126 A1 | 8/2010 | Balachandran et al. |
| 2010/0317132 A1 | 12/2010 | Rogers et al. |
| 2011/0100900 A1 | 5/2011 | Drury et al. |
| 2011/0240476 A1 | 10/2011 | Wang et al. |
| 2012/0006760 A1 | 1/2012 | Toner et al. |
| 2012/0037544 A1 | 2/2012 | Lane et al. |
| 2012/0244311 A1 | 9/2012 | Manninen |
| 2012/0244314 A1 | 9/2012 | Scheibner et al. |
| 2012/0261331 A1 | 10/2012 | Ter Horst et al. |
| 2012/0261333 A1 | 10/2012 | Moran et al. |
| 2012/0267249 A1 | 10/2012 | Cotte et al. |
| 2012/0273990 A1 | 11/2012 | O'Donnell et al. |
| 2013/0008848 A1 | 1/2013 | Jonsson et al. |
| 2013/0078163 A1 | 3/2013 | Chung et al. |
| 2014/0221544 A1 | 8/2014 | Lichtenhan et al. |
| 2015/0367257 A1 | 12/2015 | Richardson |
| 2016/0067634 A1 | 3/2016 | Richardson |
| 2016/0236120 A1 | 8/2016 | Richardson |
| 2017/0008781 A1 | 1/2017 | Richardson |
| 2017/0050407 A1 | 2/2017 | Richardson |

FOREIGN PATENT DOCUMENTS

| | | |
|---|---|---|
| CN | 106029202 | 10/2016 |
| EP | 0639223 B1 | 2/1995 |
| EP | 1196242 A1 | 4/2002 |
| EP | 1197255 A1 | 4/2002 |
| EP | 1254689 B1 | 11/2002 |
| EP | 1449585 A1 | 8/2004 |
| EP | 2505047 A2 | 10/2012 |
| WO | WO2011066055 A2 | 6/2011 |
| WO | WO2014116183 A1 | 7/2014 |
| WO | WO2015105524 | 7/2015 |
| WO | WO2015105524 A1 | 7/2015 |
| WO | WO2015199663 | 12/2015 |
| WO | WO2016037150 A1 | 3/2016 |
| WO | WO2016133929 A1 | 8/2016 |
| WO | WO2017007734 A1 | 1/2017 |

OTHER PUBLICATIONS

International Search Report and Written Opinion dated Dec. 1, 2014 in Application No. PCT/US2014/043942, filed Jun. 24, 2014.
International Search Report and Written Opinion dated Dec. 17, 2015 in Application No. PCT/US2015/048723, filed Sep. 4, 2015.
International Search Report and Written Opinion dated May 19, 2016 in Application No. PCT/US2016/018119, filed Feb. 16, 2016, 10 pages.

(56) References Cited

OTHER PUBLICATIONS

Non-Final Office Action, dated Dec. 21, 2016, U.S. Appl. No. 14/701,528, filed May 1, 2015.
Non-Final Office Action, dated Jan. 12, 2017, U.S. Appl. No. 15/045,119, filed Feb. 16, 2016.
Non-Final Office Action, dated Jan. 12, 2017, U.S. Appl. No. 14/313,924, filed Jun. 24, 2014.
Non-Final Office Action, dated Jan. 25, 2017, U.S. Appl. No. 15/233,701, filed Aug. 10, 2016.
Brown, R.C., "Electrically Charged Filter Materials," Engineering Science and Education Journal 1.2 (1992): 71-79.
Patent Cooperation Treaty Application No. PCT/US2016/040878, "International Search Report" and "Written Opinion of the International Searching Authority," dated Sep. 19, 2016, 11 pages.
Office Action dated Feb. 21, 2017 for Chinese Application No. 201480076095.3.

\* cited by examiner

FLUID FILTERS AND METHODS OF USE

CROSS-REFERENCE TO RELATED APPLICATIONS

This non-provisional U.S. patent application claims the priority benefit of U.S. Provisional Application Ser. No. 61/848,671, filed on Jan. 9, 2013, titled "FILTER WITH MULTIPLE STAGES TRANSVERSELY ORIENTED", which is hereby incorporated by reference herein in its entirety including all references cited therein. This application is also related to U.S. Provisional Application Ser. No. 61/849,098, filed on Jan. 17, 2013, titled "FILTER WITH MULTIPLE STAGES TRANSVERSELY ORIENTED IMPROVED" and U.S. Provisional Application Ser. No. 61/851,987, filed on Mar. 14, 2013, titled "FILTER WITH LAYERED CONSTRUCTION" all of which are hereby incorporated by reference herein in their entireties including all references cited therein.

FIELD OF THE INVENTION

The present technology is directed to filters, and more specifically, but not by way of limitation, to filters that comprise multiple staged layers which are alternatingly and transversely oriented to one another. These filters advantageously are configured to filter a particulate bearing fluid to remove particles of various sizes.

BACKGROUND

Fluid filters are utilized to separate particulate matter that is dispersed in a fluid. For example, fluid filters are used to desalinate water, purify lubrication fluids in mechanical devices, and remove particular matter from air or other gaseous fluids. Examples of filters include U.S. Pat. No. 6,524,488, which describes a filtration media formed from at least one structured polymeric layer, wherein a structured surface is defined within the layer. Layers may be configured as a stack that has the structured surfaces defining a plurality of ordered inlets open through a face of the stack and corresponding ordered fluid pathways, thereby forming an ordered, porous volume. The ordered fluid pathways may be defined by a plurality of flow channels formed within the structured surfaces of the structured layers, or may be defined by a plurality of protuberances formed in an ordered pattern within the structured surfaces of the structured layers. Also, U.S. Pat. No. 7,282,148 describes an asymmetric filter membrane, and process for making the same. The membrane structure is physically robust and suitable for use in a wide variety of applications. The support membrane is may be comprised of material such as a porous silicon or a silicon oxide, and the separation membrane may be comprised of material such as a polymer, zeolite film, or silicon oxide. The process relies on steps adapted from the microelectronics industry.

Further, US 2012/0267249 describes a filter that includes a membrane having a plurality of nanochannels formed therein. A first surface charge material is deposited on an end portion of the nanochannels. The first surface charge material includes a surface charge to electrostatically influence ions in an electrolytic solution such that the nanochannels reflect ions back into the electrolytic solution while passing a fluid of the electrolytic solution. Methods for making and using the filter are also provided.

SUMMARY OF THE PRESENT TECHNOLOGY

According to some embodiments, the present technology may be directed to a filter device, comprising a plurality of panels, each of the plurality of panels comprising a filtering front surface and a flat back surface, the filtering front surface comprising: a first row of vertically extending protrusions spaced apart from one another to form vertical channels, the first row proximate an inlet of the filter device; a second row of vertically extending protrusions spaced apart from one another to form vertical channels, the second row proximate an exit of the filter device; one or more rows of filtering protrusions, the one or more rows being vertically spaced apart from one another and extending between the first and second rows of vertically extending protrusions, each row of filtering protrusions comprising filtering protrusions that are spaced from one another to form filter channels having a size that is configured to receive and retain objects of a given size; and wherein the plurality of panels are stacked in a mating configuration such that the filtering front surface of one panel is in mating contact with the flat back surface of an adjacent panel.

According to some embodiments, the present technology may be directed to a substrate panel for filtering a fluid, the substrate panel, comprising a filtering front surface and a flat back surface, the filtering front surface comprising a first row of vertically extending protrusions spaced apart from one another to form vertical channels, the first row proximate an inlet of the filter device; a second row of vertically extending protrusions spaced apart from one another to form vertical channels, the second row proximate an exit of the filter device; and one or more rows of filtering protrusions, the one or more rows being vertically spaced apart from one another and extending between the first and second rows of vertically extending protrusions, each row of filtering protrusions comprising filtering protrusions that are spaced from one another to form filter channels having a size that is configured to receive and retain objects of a given size.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
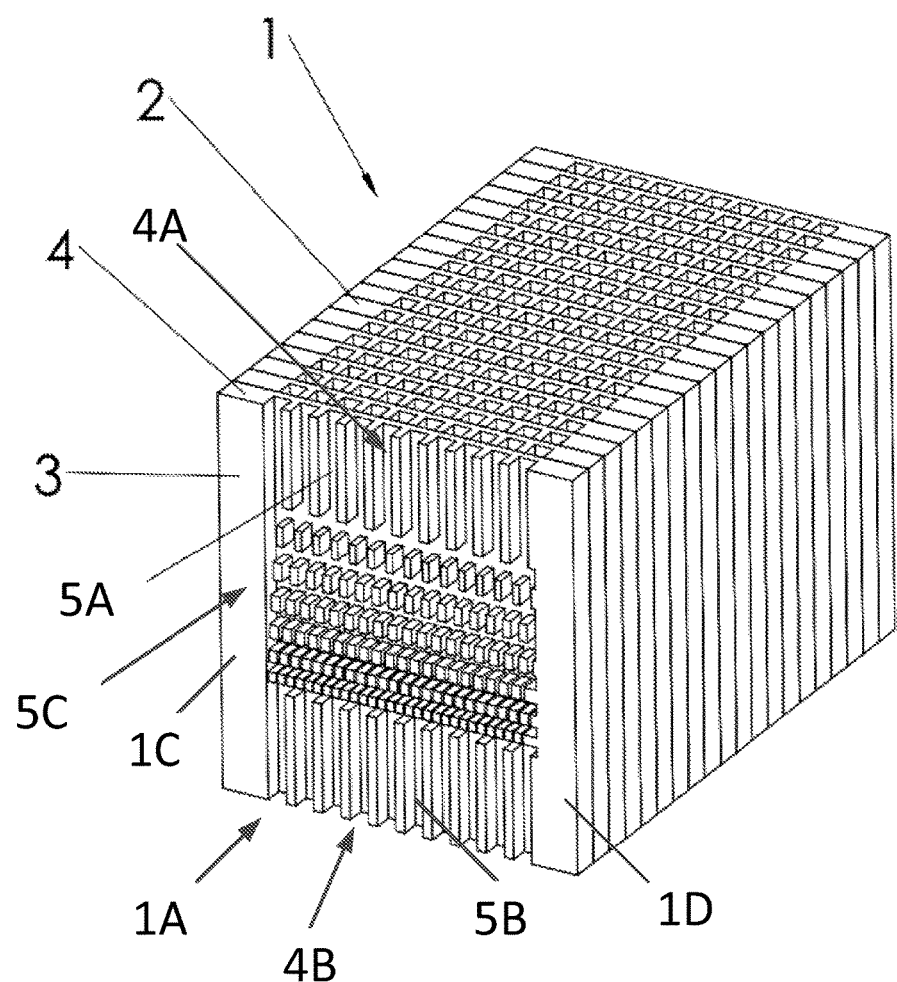
FIG. 1 is an isometric view of a section of a filter.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

The present invention relates to filters for the filtering of or separation of different sized particles. A common use of a filter is in automobiles and trucks. Filters are used to remove solid particles from the air used by internal combustion engines. Filters are also used to remove particles from the oil used in both engines and transmissions.

Typically filters used in these applications use a membrane with small apertures to remove particles from the air or oil. The material is often folded many times to create as much surface area of filter material in a small overall area.

Smaller sized apertures in the membrane capture smaller sized particles. These smaller apertures also create more restriction in the flow of either a fluid or gas that is being filtered therethrough. In the case of an air filter for internal combustion engines, smaller apertures may result in reduced performance and reduced fuel economy. If the apertures are made larger, performance increases but engine life is reduced.

Filter type structures can also be used to separate different sized particles from a fluid. Separation of particles can be used to separate biological materials or different sized molecules from a fluid.

The desalination of water is one area where filter material is used to separate different sized molecules. This task requires the removal of sodium chloride molecules from smaller water molecules. For the desalination of salt water the relative amount of sodium chloride in relationship to the water molecules is high. Because of this high ratio, a significant amount of sodium chloride is collected in the filter when processing modest amounts of water.

According to some embodiments, the present technology is directed to a filter with a number of layers of panels or films in combination with structured elements that are laminated together to form a series of channels which filter or trap specific sizes of particles or molecules. The panels have an entrance region formed of relatively wide channels where only large particles are restricted. These entrance regions also facilitate the slitting of the panel during manufacturing. Following the entrance region are a series of progressively narrower channels that restrict the passage of particles. A transverse channel between the filter channels allows for a cross matrix of flow from adjacent channels of differing width.

As background, typically an entire row of structures would comprise only one width of channels. For a bypass type filter typically used in oil filtration, a row may have different width channels. For instances where a significant percentage of one specific sized particle or molecule is to be filtered there would be a series of bypass rows to collect the relative large quantity of the specific sized particles or molecules.

Further rectangular cross sectioned filter channels allow for more efficient collection of generally round type particles or molecules. To reduce restriction of flow, radii may be added to the leading and trailing edges of the channels.

Referring first to FIG. 1, which illustrates an example of a filter 1 that is constructed in accordance with the present technology. Fluid or gas flows into the filter 1 from the top surface 2 or "inlet" of the filter 1. The filter panels 3 are layered together where the top edges 4 of the filter panels 3 forms the top surface 2 of the filter 1. The number of filter panels 3 layered together will vary according to design requirements as would be appreciated by one of ordinary skill in the art. In some embodiments, the number of filter panels 3 may be in the hundreds or thousands. The width of the filter panels 3 may also vary according to design requirements or specifications, including, but not limited to, the application for the filter (e.g., desalinization versus cabin air filtering in a vehicle).

Figure 18:
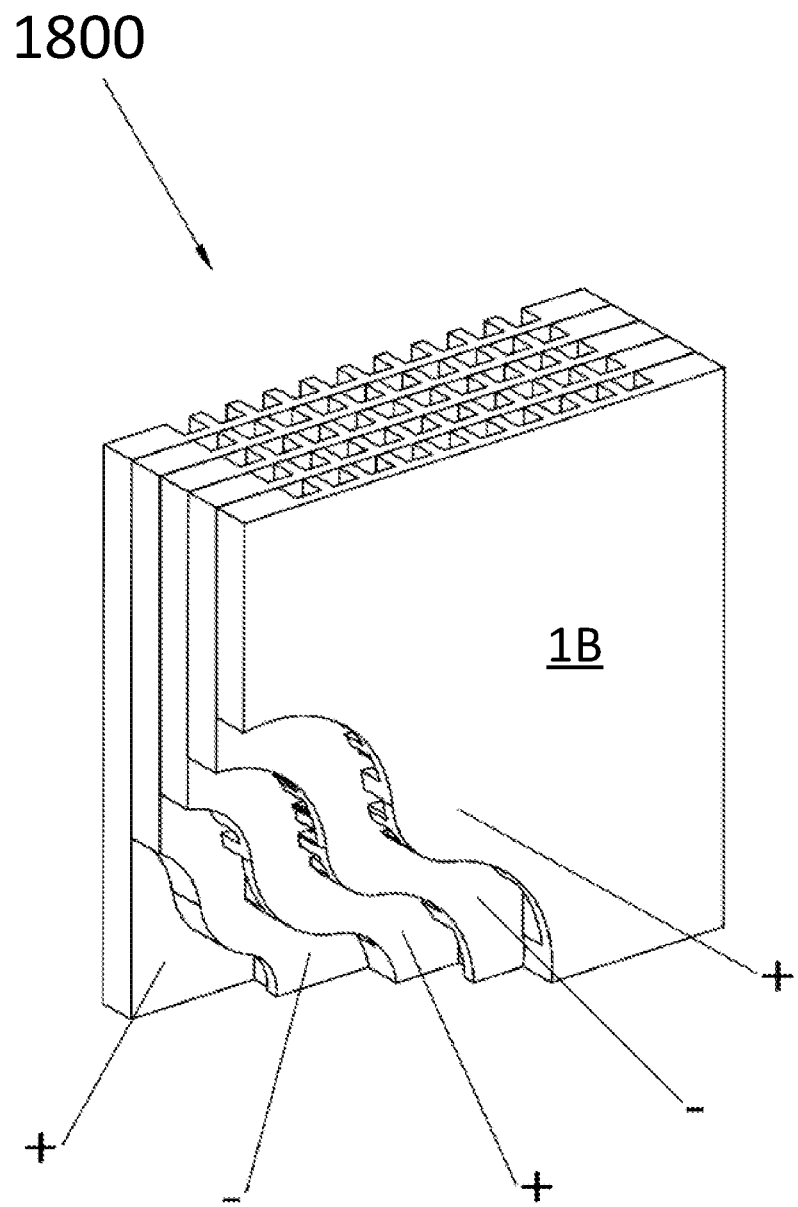
FIG. 18 is an isometric rear view of an alternate filter panel.

Each panel 3 comprises a filtering front surface 1A and a flat back surface 1B (see FIG. 18). The panel 3 also includes a pair of flanges 1C and 1D which are disposed along the outside edges of the panel 3. These flanges serve to provide structural support to the panel 3. Additionally, when panels are stacked, the panels will mate together at least at their flanges.

An exemplary filter (substrate) panel 3 includes a first row of vertically extending protrusions 4A that are disposed near the top surface 2 of the panel 3, as well as a second row of vertically extending protrusions 4B disposed near a bottom surface of the panel 3. The vertically extending protrusions the first row are preferably spaced apart from one another to form vertical channels 5A. Likewise, the vertically extending protrusions the second row are preferably spaced apart from one another to form vertical channels 5B.

It will be understood that a vertically extending protrusion may include, for example, a rectangular dentil or block shaped object that extends normally from the surface of the panel 3. These protrusions may have a consistent shape and size relative to one another, or may be irregular in both shape (e.g., square, triangular, rectangular) and size (e.g., height, width, length).

The vertical channels 5A and 5B in the filter panel 3 are arranged vertically along the horizontal length of the top edge 4 of the filter panel 3. The number of vertical channels 5A and 5B may vary in accordance with design specifications. In some embodiments, the panel 3 may comprise hundreds or thousands of the vertical channels 5A and 5B. In some embodiments all of the channels of the filter 1 would be arranged together or configured to create a consistent pattern, producing a filter 1 of having a consistent cross-sectional area. Although, for different applications of the filter, different patterns of filter panels may be layered together in varying or irregular patterns.

In some embodiments, the filter panel 3 comprises one or more rows of filtering protrusions 5C. For example, the panel of FIG. 1 includes six rows of filtering protrusions. Additional details regarding vertically extending protrusions and rows of filtering protrusions are described in greater detail relative to FIG. 2.

Figure 2:
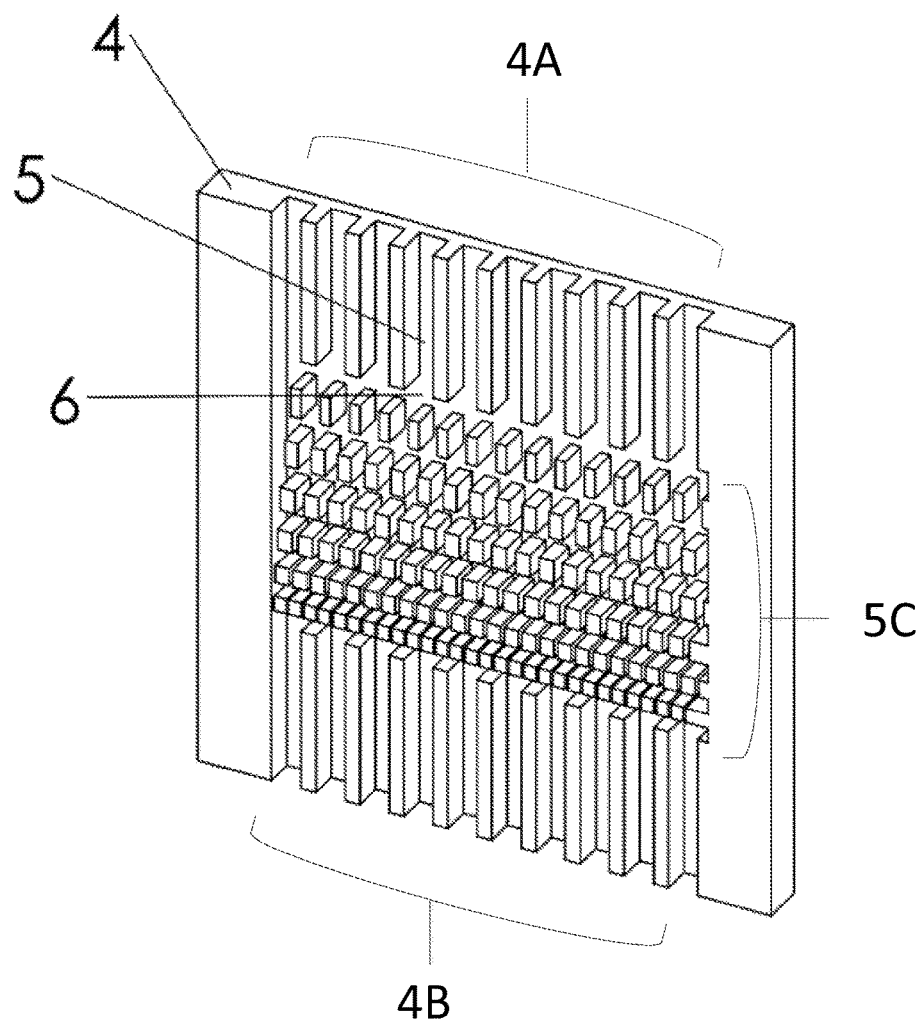
FIG. 2 is an isometric view of one panel of the filter.

Referring to FIG. 2, only one filter panel 3 is shown. The vertical channels 5A and 5B are generally equally spaced and the same size relative to one another. The width of each of the upper vertical channels 5A is ideally larger than most of the particles dispersed through the fluid. For example, the vertical channels 5A might be 200 microns in width and 200 microns in depth. The horizontal spacing of the vertical channels 5A in the filter panel 3 might be 300 microns, whereas the entire thickness of the filter panel 3 might be 300 microns.

It will be understood that the closer the thickness is to the depth of the channels the greater the overall density of the filter 1. For example, the height of the vertical channels 5A might be 500 microns. This relative large dimension allows for variations in the manufacturing process of the filter panel 3. For greater ease of manufacturing the vertical channels 5 might be taller than 500 microns. In other embodiments the vertical channels 5 may have a height that is shorter than 500 microns if a more compact filter is desired.

The vertical channels 5A terminate in the first cross channel 6. The first cross channel 6 extends, in one embodiment, from the left side of the vertical channels 5A to the far right side of the vertical channels 5A. The height of the first cross channel 6 might be 200 microns and would preferably be the same depth as the vertical channels 5A.

Figure 3:
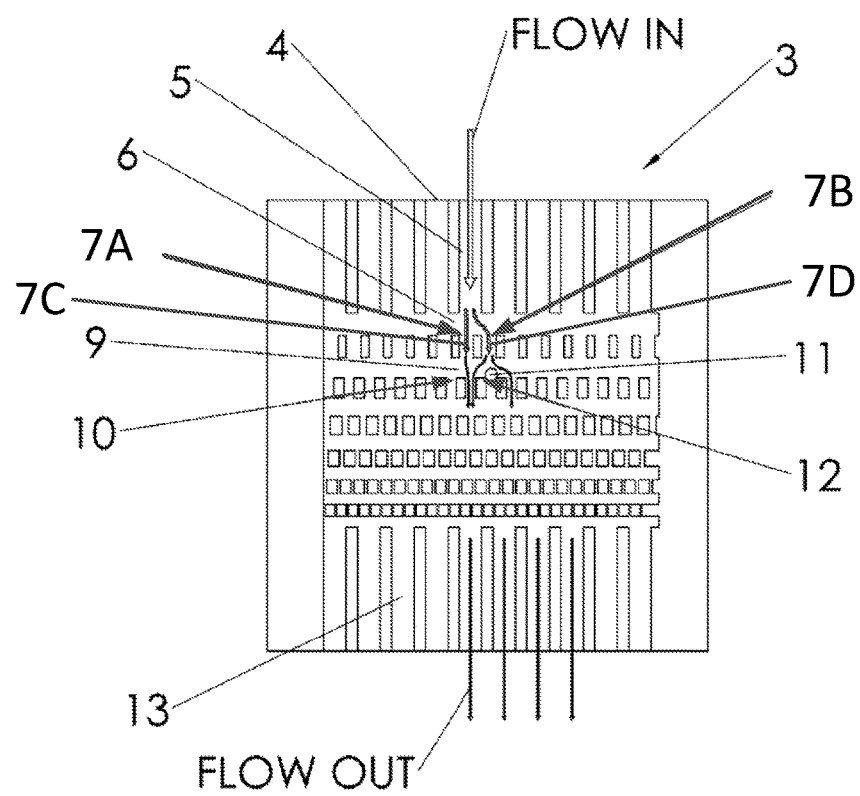
FIG. 3 is a front view of one panel of the filter shown in FIG. 2.

Referring to FIG. 3, where the filter panel 3 is shown in a front view with arrows depicting fluid flow. The flow exits the vertical channels 5A and flows into the first cross channel 6.

The fluid then encounters the first of a plurality of rows of filtering protrusions. By example, a first row of filtering protrusions 7A may include filtering protrusions that are spaced from one another to form filter channels 7B. Each of the filter channels 7B are sized to receive and retain objects of a given size, such as particles dispersed in the fluid that flows through the panel 3.

The panel 3 includes six rows of filter protrusions that form filter channels. The filter channels for a given row are substantially the same size. Additionally, the filter channel size is reduced in relation to the position of the row. For example, the width of the filter channels of the row closest to the vertical channels 5A are larger than the width of the filter channels of the row closest to the vertical channels 5B that are proximate the exit of the filter panel 3. The widths of filter channels of rows therebetween become successively smaller.

Thus, the panel 3 is "multi-staged" because it includes more than one row of filtering protrusions that are arranged so as to capture particles dispersed in a fluid in such a way that larger particles are trapped in upper rows of the filtering protrusions and progressively smaller particles are trapped in other, lower rows of filtering protrusions that form filtering channels.

It should be noted that the limiting factor for the particle size to be trapped in the filters described herein may be either the width or the depth of the filter channels. In some cases it may be preferable to control the size of the particle trapped via depth due to the ability to deposit very thin layers of materials. For example, the practical size limit for protrusions created by lithography is approximately 14 nanometers. Deposition allows a user to control channel depth to roughly the size of an atom, or approximately 1 nanometer.

The fluid or gas can flow into a filter channel 7C directly under the vertical channel 5A or it can flow to the neighboring filter channel 7D. In fact the fluid may flow to any of the row of first filter channels to the left or the right. In some embodiments, the width of each of the row of first filter channels is narrower than the width of the vertical channels 5A.

In one embodiment, the first row of filter channels might be 130 microns wide, 70 microns narrower than the vertical channels 5A. The horizontal spacing may also be narrower, from 300 microns of the vertical channels 5 to 200 microns. The first row of filter channels may not allow particles in the fluid or gas to pass through if they were greater than the 130 micron width.

It should be noted that the depth of the first row of filter channels have a similar width as the other channels, for example, 200 microns. So an asymmetric particle having a minor width of less than 130 microns could pass through the first row of filter channels even though some portion of the particle is wider than 130 microns.

In some embodiments, the first row of filter channels 7B is much shorter than the vertical channels 5A. The first row of filter channels 7B terminates at the second cross channel 9. The second cross channel 9 is similar to the first cross channel 6 except it might be shorter in height, 180 microns for example. The second cross channel 9 extends, at minimum, from the left vertical channels 5A to the far right vertical channels 5A.

The fluid or gas can flow from the second cross channel 9 to the second row of filter channels 10 directly under the first row of filter channels 7B. Again, the second row of filter channels 10 is formed by a second row of filter protrusions 10A that are spaced apart from one another. As mentioned above, the width of the second row of filter channels 10 may be smaller than the width of the first row of filter channels 7B.

A particle 11 is shown as lodged in a filter channel of the second row, between two adjacent filter protrusions of the second row. The depth of the particle 11 effects whether an adjacent filter channel is entirely or partially blocked. Regardless, the particle 11 at least partially blocks a neighboring filter channel in this example. The second cross channel 9 allows the blocked flow to flow to other filter channels in the second row.

Again, additional rows of filter protrusions and filter channels are repeated with smaller and small feature sizes to create a multi-staged filter with accurate control of particle collection and retention. In some instances, adjacent rows of filter protrusions may be offset from one another. For example, the first row of filter protrusions 7A may be offset from the second row of filter protrusions 10.

The filter panels 3 would typically be made by molding the features into a plastic film. The tool used to mold the channels would be a negative to that of the filter panels 3. The features in the tool could be machined in the tool with precision machining processes, etched, or the features could be made with semiconductor manufacturing type processes. One knowledgeable in the art of fabrication tools with micro or nano sized features could devise the best method to fabricate a tool for a specific filter design. It should be noted that the accuracy of semiconductor type manufacturing processes can be extremely high. This results in extremely accurate widths of the fluid channels in the panels 3 of the filter 1, allowing for accurate and exact filtering of particles. This is especially important when the filter is used to separate different sized particles.

As mentioned above, after the last row of filter protrusions there are the exit vertical channels 5B, which are configured to direct the filtered fluid out from the filter 1.

Figure 4:
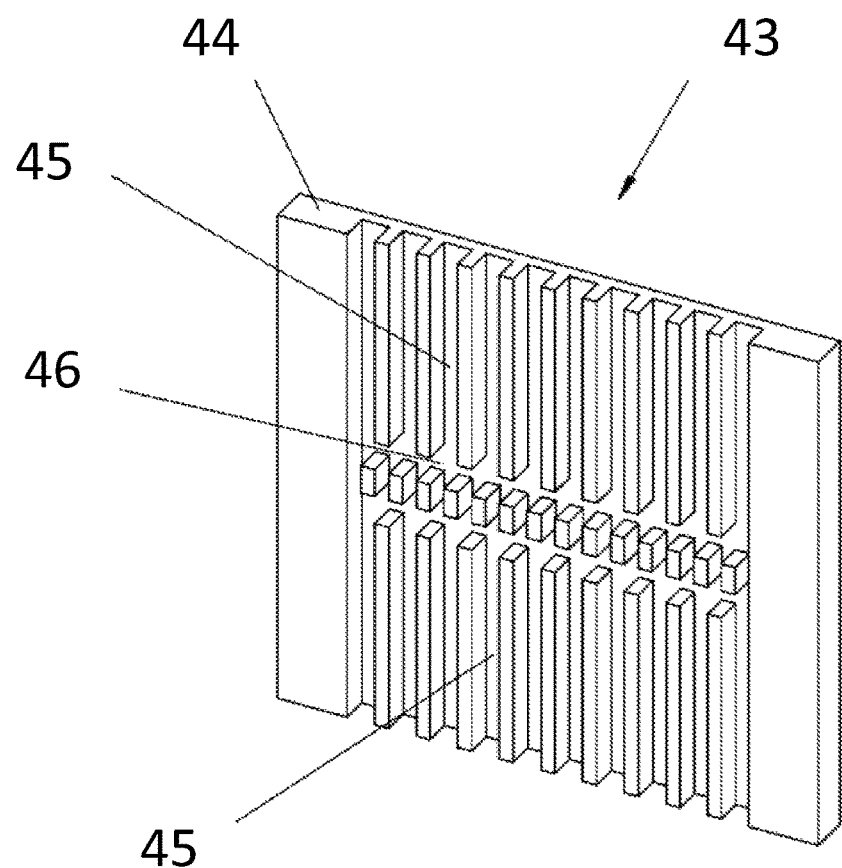
FIG. 4 is an isometric view of an alternate filter panel.
Figure 5:
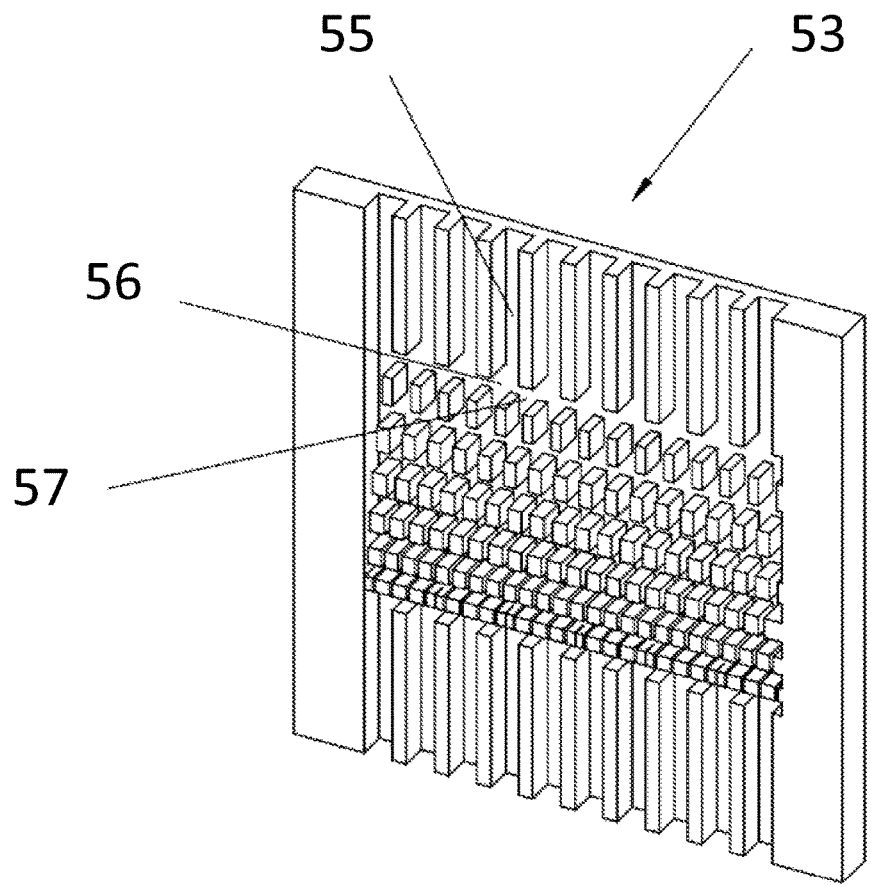
FIG. 5 is an isometric view of another alternate filter panel.
Figure 6:
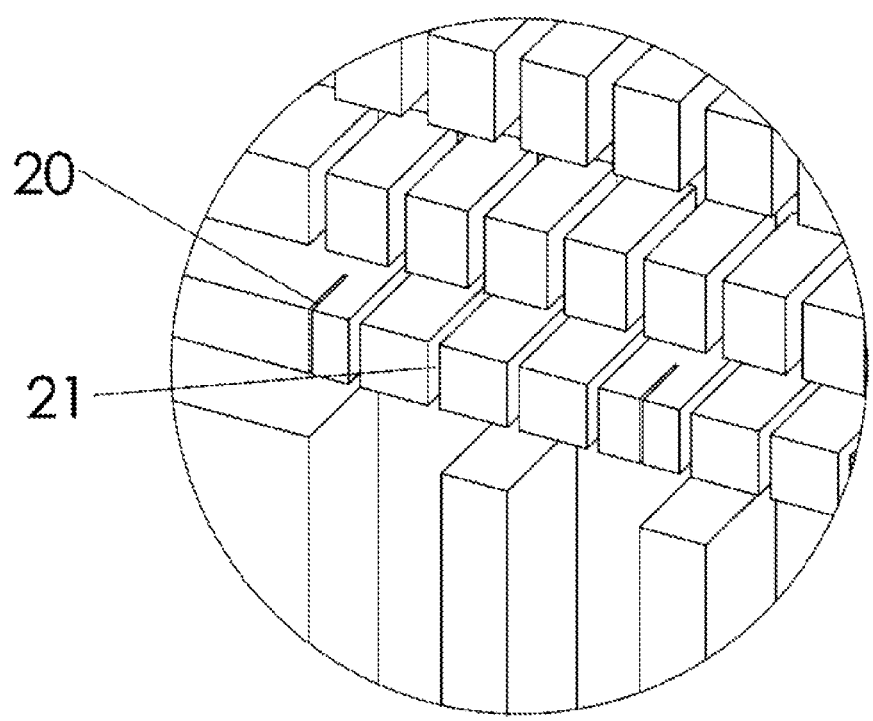
FIG. 6 is a close-up view of FIG. 5.

Referring to FIG. 4, a filter panel 43 of a single stage filter is shown. The single stage filter would be used to separate a specific particle of greater than one size. The filter panel 43 includes an inlet 43, vertically extending protrusions 45, and a row of filtering protrusions 46 that form filtering channels. FIG. 5 illustrates an exemplary filter panel 53 in the form of a bypass type filter. The panel 53 includes vertically extending protrusions 55, a cross channel 56, and a plurality of rows of filtering protrusions 57 that form filtering channels. FIG. 6 is a close-up of the bypass area in FIG. 5. This type of filter would be used with a fluid that is circulated many times through the filter such as an oil filter for an internal combustion engine.

Two different width filter channels are located along one row. Some of the fluid flows through the narrow channels 20, also referred to as a "filter groove". The narrow channels filter out tiny particles and are also restrictive to the flow. Most of the fluid flows through the less restrictive wide channels 21 (e.g., filter channels). When it is not essential that extremely small particles be filtered out on the first pass through the filter panel 3 and if the restriction of the filter is a concern, this type of filter may be utilized. In every pass of fluid through the filter panel 3 an increasing number of the small particles are removed from the fluid.

Figure 7:
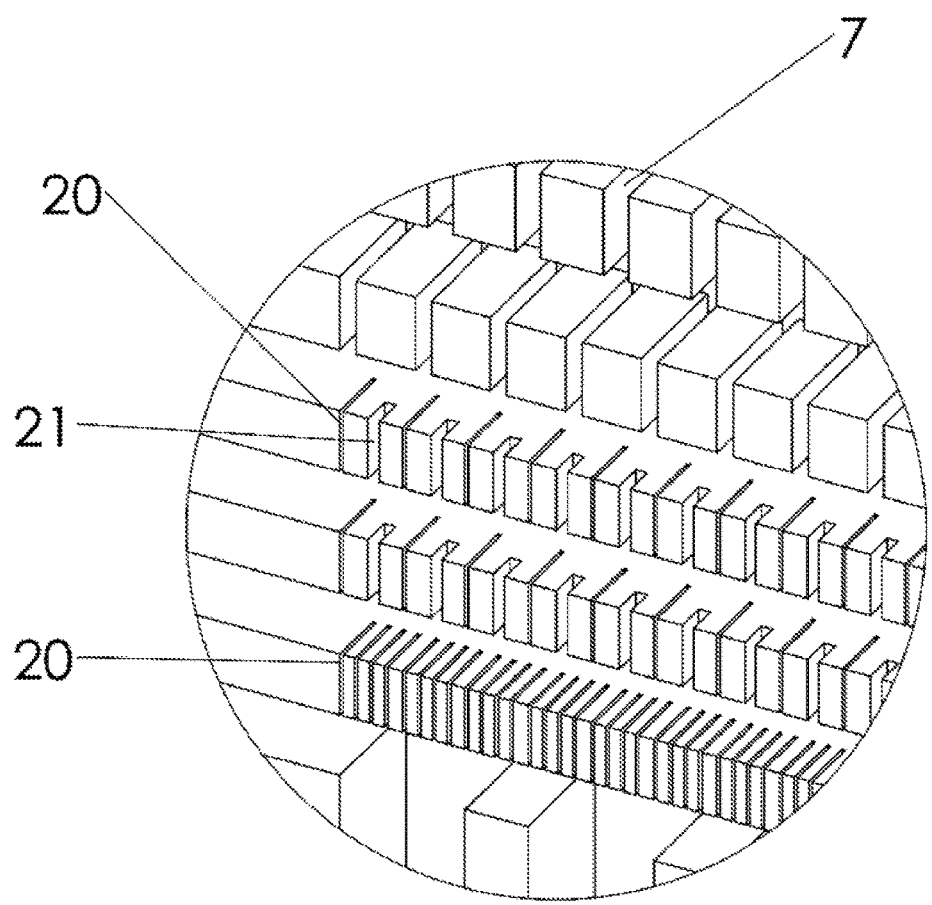
FIG. 7 is a close-up view of another alternate filter panel.

Referring to FIG. 7, another alternate bypass type filter design is shown. Two rows of filter channels have both narrow 20 and wide width 21 filter channels. This type of filter may be used to remove a large quantity of a specific sized molecule such as sodium chloride molecules. With the desalinization of salt water the concentration of salt molecules is high. Thus, by incorporating multiple rows of bypass filter channels a greater quantity of sodium chloride molecules can be removed by the filter before the fluid channels are all blocked. With desalinization it is desired that virtually all the salt be removed from the water. The last row of filter channels would be all be narrower than the sodium chloride molecules. It should be noted that the quantity of bypass rows and the width, depth and length of the filter channels will vary according to design requirements and application specifications.

Figure 8:
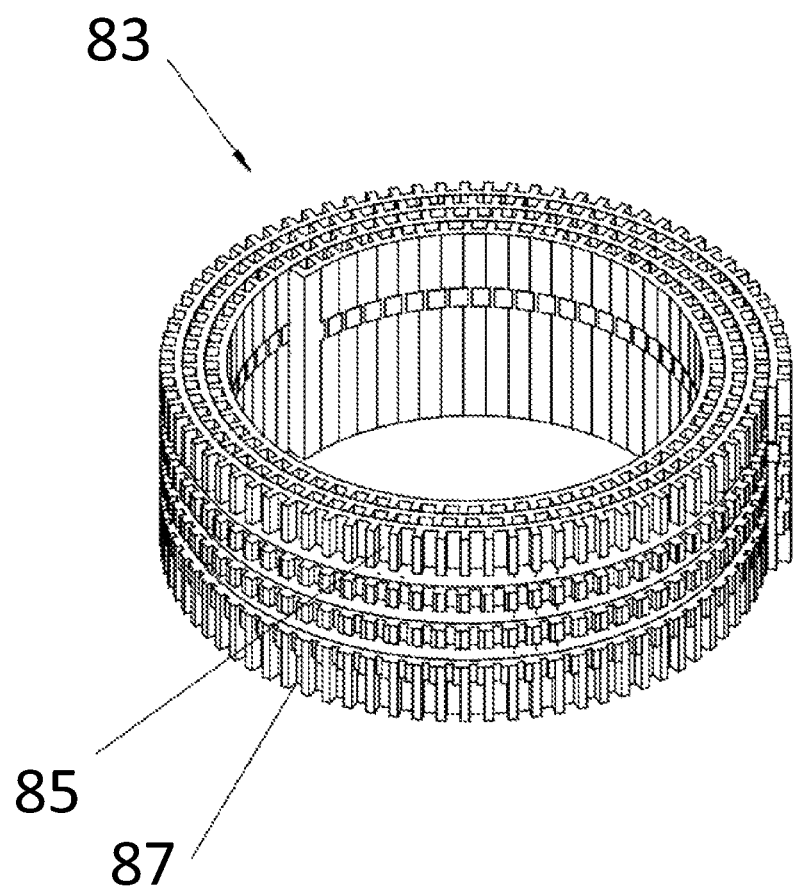
FIG. 8 is an isometric view of a spiral configuration of the filter.

Referring to FIG. 8, an alternate configuration of the layers of the filter panel 3 is disclosed. By rolling one filter panel 83 in a spiral manner a round filter 83 can be created. The filter 83 may be manufactured in a roll-to-roll manufacturing process.

Figure 9:
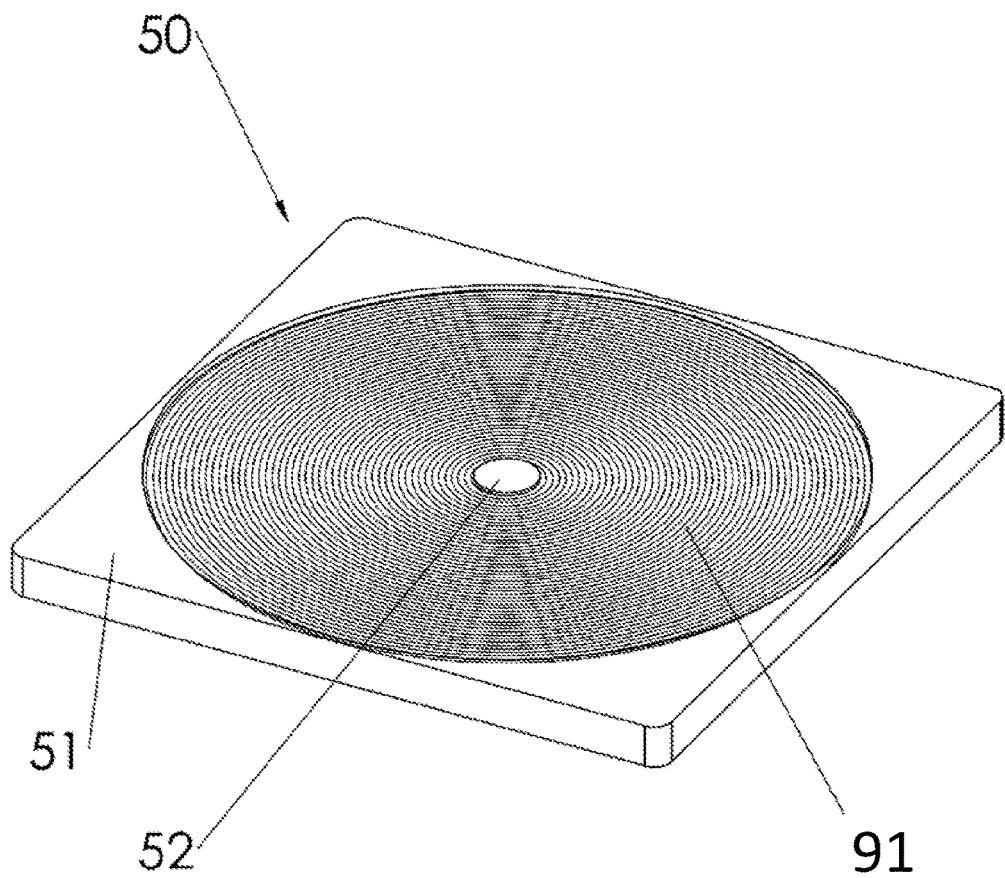
FIG. 9 is an isometric view of a circular configuration of the filter.

Referring to FIG. 9, an enclosed spiral filter 91 as shown in FIG. 8 is shown. The filter 1 is encased in a square frame 51 and the center hole in the spiral filter 50 is filled with a center plug 52. This type of filter assembly might be used for filtering air used by an internal combustion engine.

Figure 10:
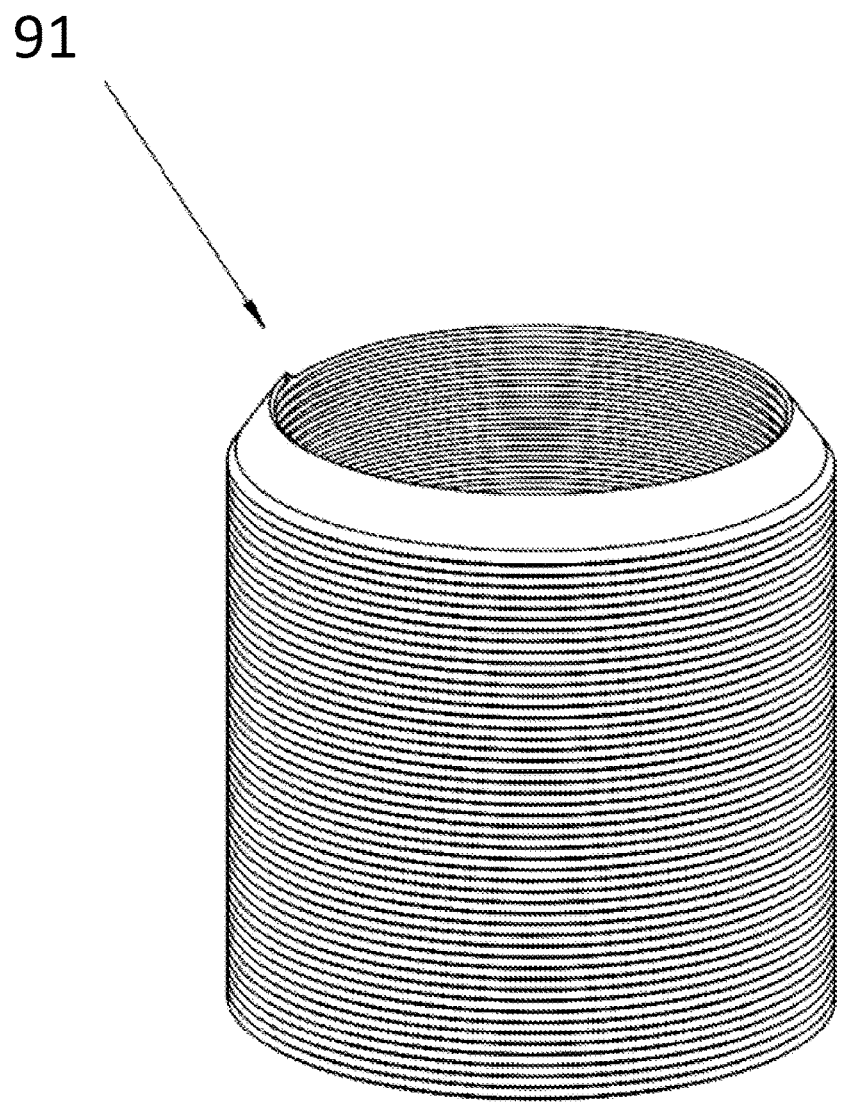
FIG. 10 is an isometric view of a conical configuration of the filter.

Referring to FIG. 10, an alternate arrangement of the filter 91 is shown configured in a cylindrical manner. This type of arrangement is applicable to internal combustion engine oil filters.

Figure 11:
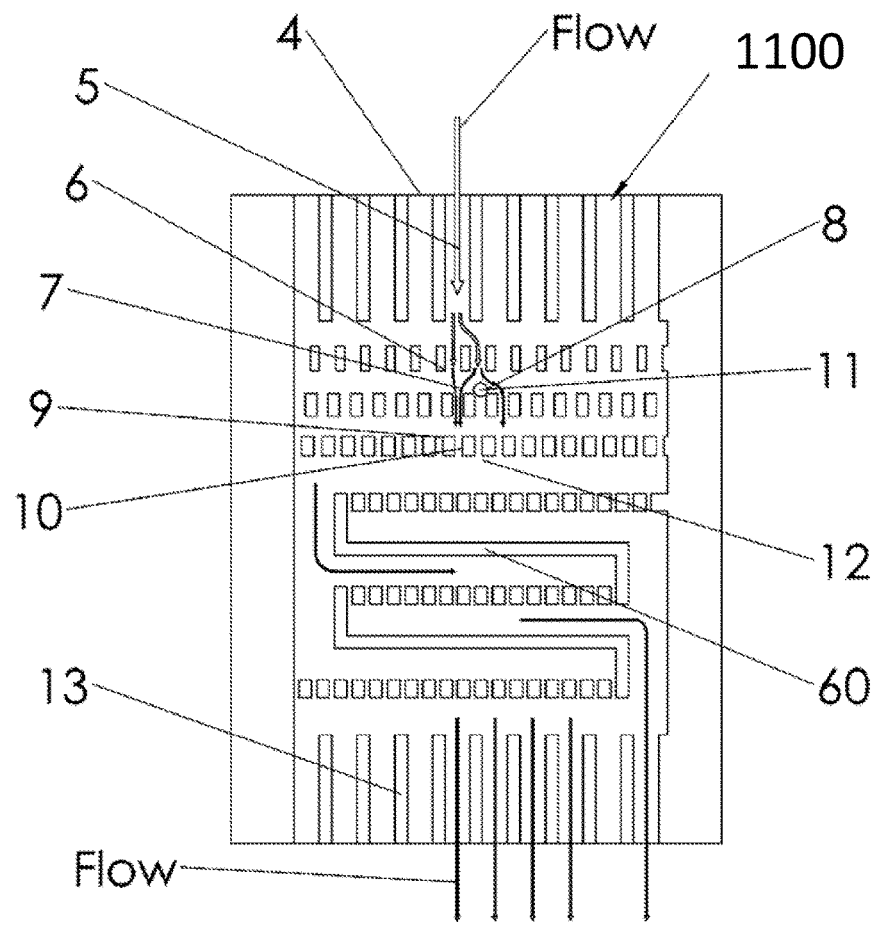
FIG. 11 is a front view of an alternate bypass filter panel.

Referring to FIG. 11, another arrangement of the filter panel 1100 is shown. The separation wall 60 allows for channels to flow into multiple rows of equally sized (or differently sized) filter channels. This type of arrangement would also be useful for the separation of a large concentration of one particle size, such as with desalinization. Again, salt water is an example of a fluid with a high concentration of one sized particle.

Figure 12:
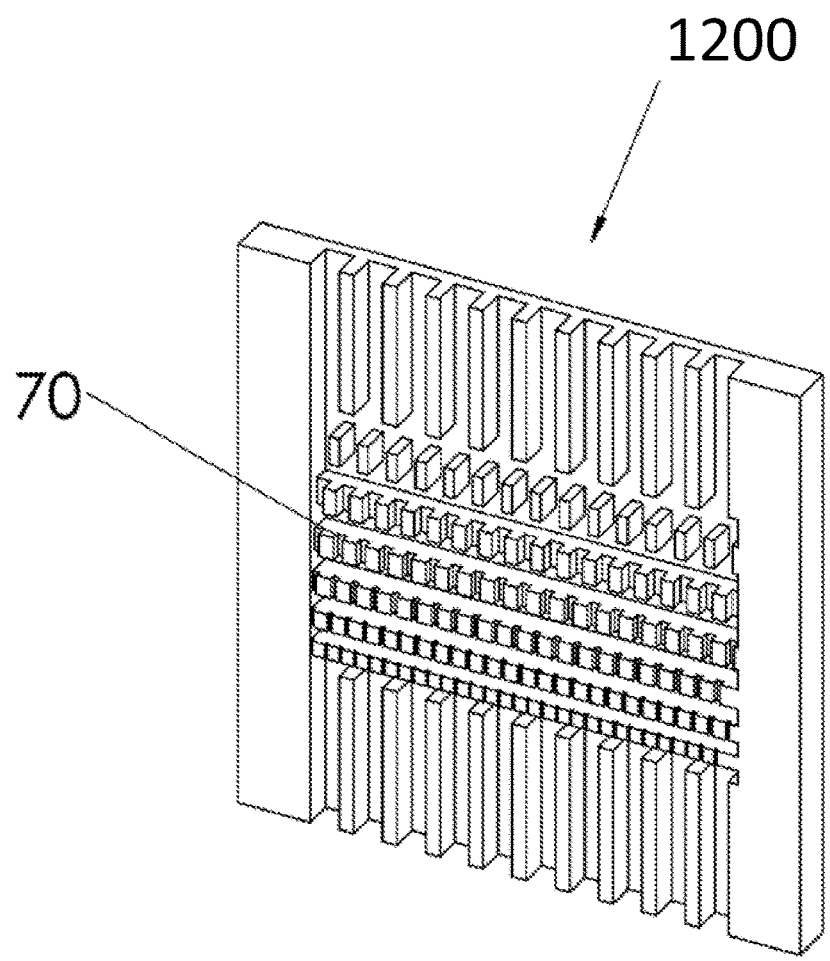
FIG. 12 is an isometric view of an alternate filter panel.

Referring to FIG. 12, the filter panel 1200 is shown with the depth of the filter channels equal to the width of the filter channels creating square filter channels 70. This geometry would filter particles where at least two orthogonal dimensions of the particles are greater than the width, and depth of the filter channel.

Figure 13:
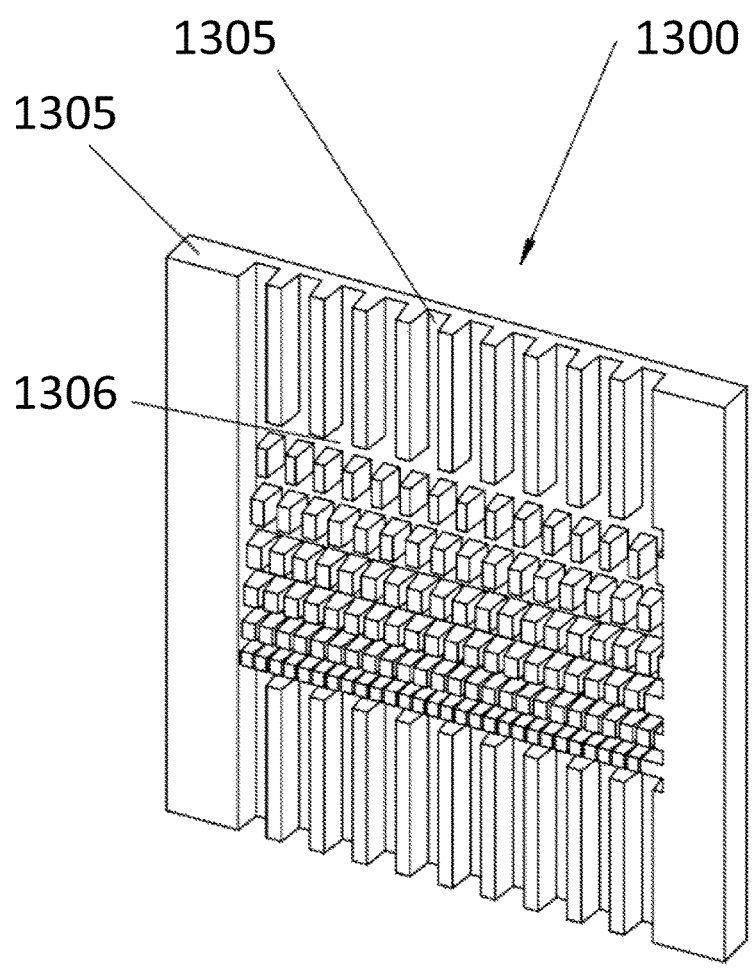
FIG. 13 is an isometric view of an alternate filter panel.

Referring to FIG. 13, the filter panel 3 features are shown to have draft or tapering. The pane 1300 comprises vertically extending protrusions 1305, an inlet 1310, and a first cross channel 1315, as well as rows of filtering protrusions. Draft or draft angle is the amount of taper put in the mold to facilitate the removal of the molded or cast parts. Draft is often used in the molding process. The taper created by the draft reduces the force required to extract the filter layer from the molding tool. The draft at the channels does not affect the function of the filtering. So having larger rather than smaller draft would most likely be utilized. Draft of the filter channel walls does effect the filtering. Specifically, it would allow a slightly wider range of particles to pass through a filter channel.

Figure 14:
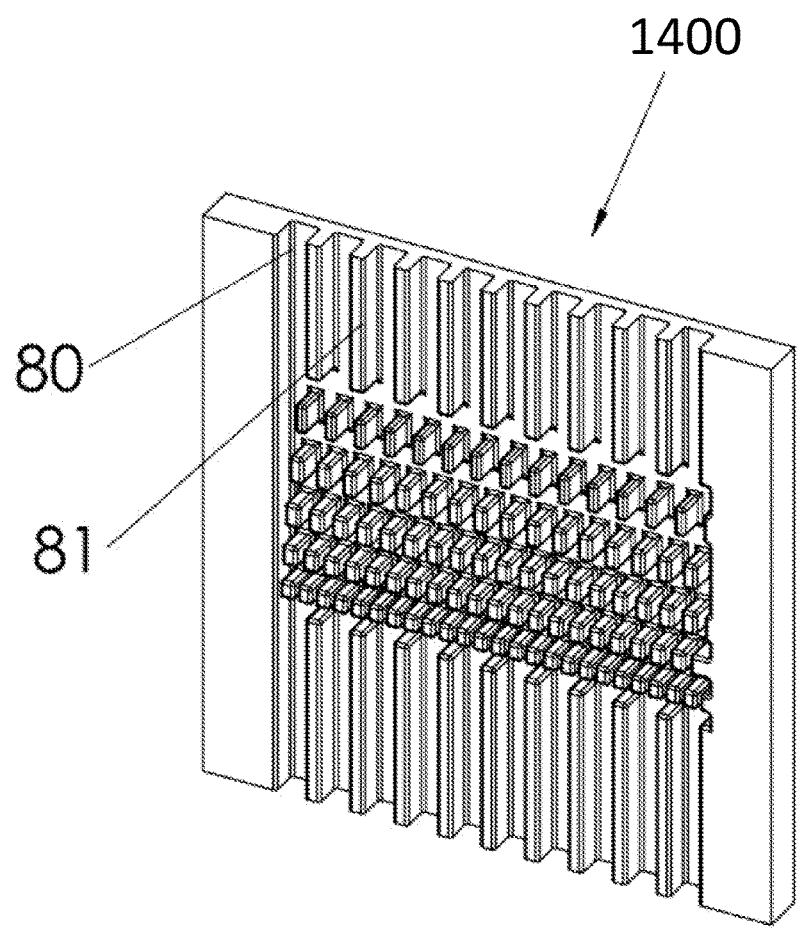
FIG. 14 is an isometric view of an alternate filter panel.

Referring to FIG. 14, radii 81 and fillets 80 are shown on the vertically extending protrusions and the filter protrusions of a panel 1400. These radii or fillets can be incorporated to improve the manufacturability of either the filter layer or the tool to manufacture the filter layer.

Figure 15:
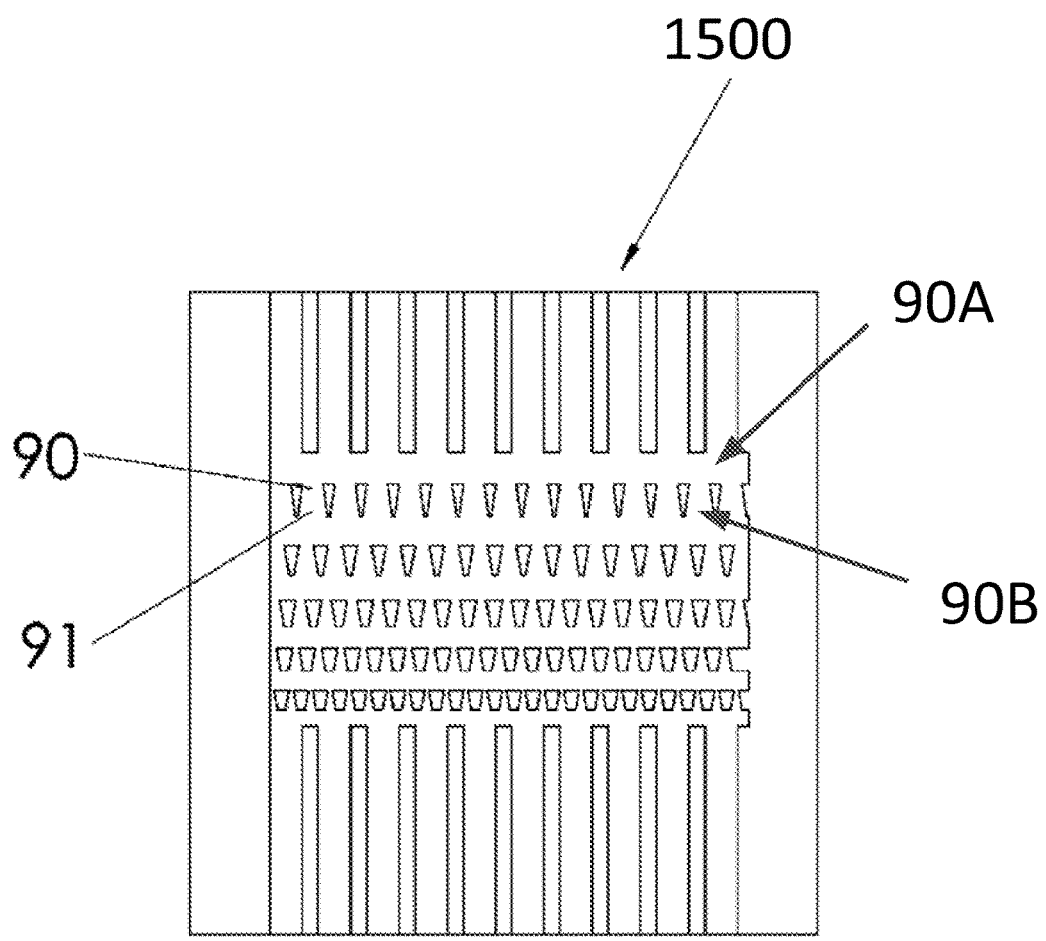
FIG. 15 is a front view of an alternate filter panel.

Referring to FIG. 15, the filter protrusions 90A are shown with angled tapered walls such that the filter channels 90B widen as the fluid flows through the filter channel of a panel 1500. The addition of this taper allows capture of particles that are less likely to be trapped in the channel. The particles would only be trapped at the inlet portion 90 of the filter channel and not the wider outlet portion 91. This type of channel might be deployed when it is desirable to recover the filtered particles after the fluid is filtered. This would be useful when separating a specific sized cell or particle to later be used in another process.

Figure 16:
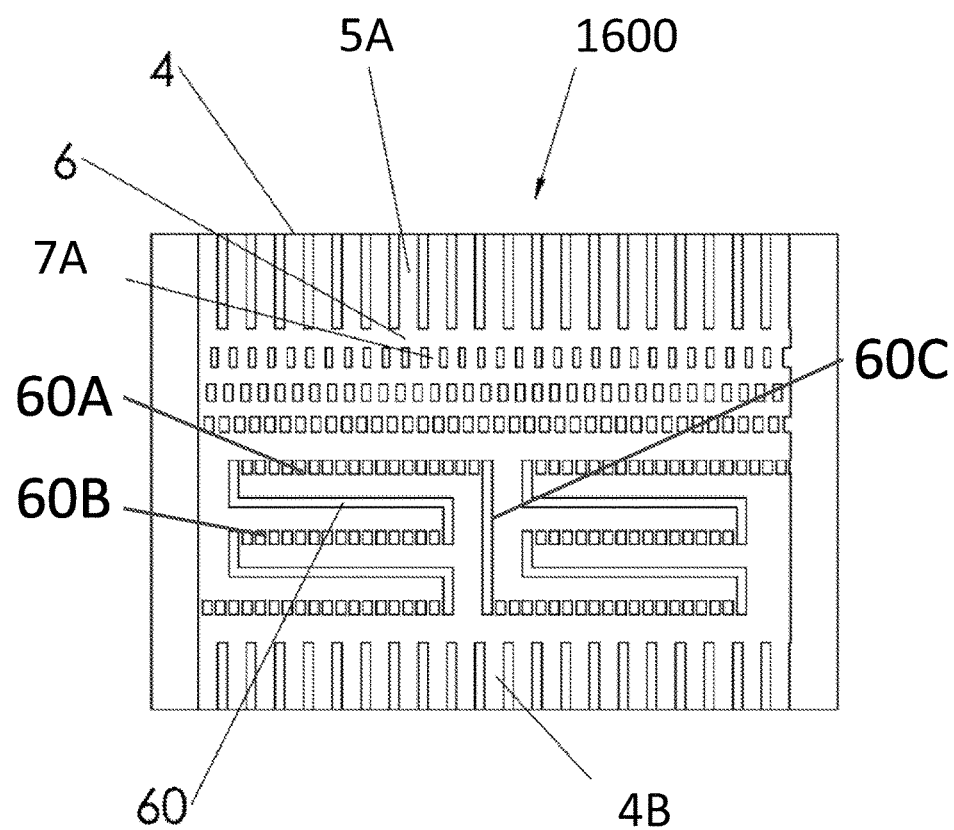
FIG. 16 is a front view of an alternate filter panel.

Referring to FIG. 16, the filter panel 1600 is shown with two separation walls 60 next to one another. The filter 1600 also includes features found in the panel of FIG. 1 such as an inlet 4, vertical protrusions 5A, and so forth. FIG. 16 further shows separation walls 60 disposed between rows of filtering protrusions 60A and 60B. The number of separation walls in the vertical direction, such as separation wall 60C, could also be numerous. Having a relatively large number of vertically stacked separation walls 60 would allow the filter to collect a large number of a specific sized particle. It should be noted that for small particles, the center-to-center spacing of the separation walls 60 may be from only one to 100 microns. With a spacing of ten microns 100 separation walls 60 could fit in a one millimeter high area.

Figure 17:
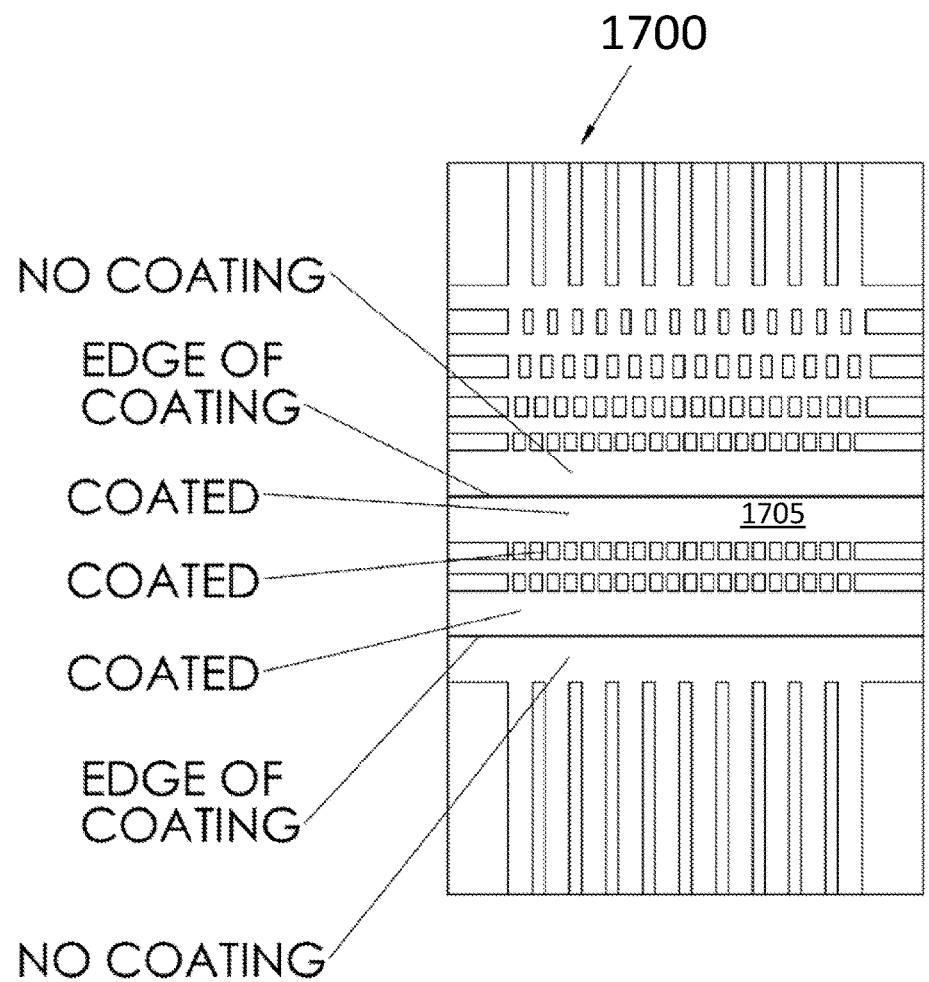
FIG. 17 is a front view of an alternate filter panel.

Referring to FIG. 17, the filter panel 1700 is shown with a section 1705 coated with a thin layer of a different material than the base material. This thin layer may be absorbent, leading to the separation of the sample components. These interactions are physical in nature, such as hydrophobic (dispersive), dipole-dipole and ionic, and are most often a combination thereof. It should be noted that more than one different type of material could be coated along the filter path. The different areas might have different sized filter channels.

Referring to FIG. 18, the filter 1800 is shown with electrically charged surfaces. For example, the back surface 1B of each panel may be charged. Further, the charge alternates with each panel such that positive charged panels are alternated with negatively charged panels. These charges can be used to attract particles to the walls of the filter channels. The charge could be imbedded in the filter material if the material was a polymer. A layer of conductive material could be added to the surface of the filter panel with the conductive material charged by an external voltage source.

Figure 19:
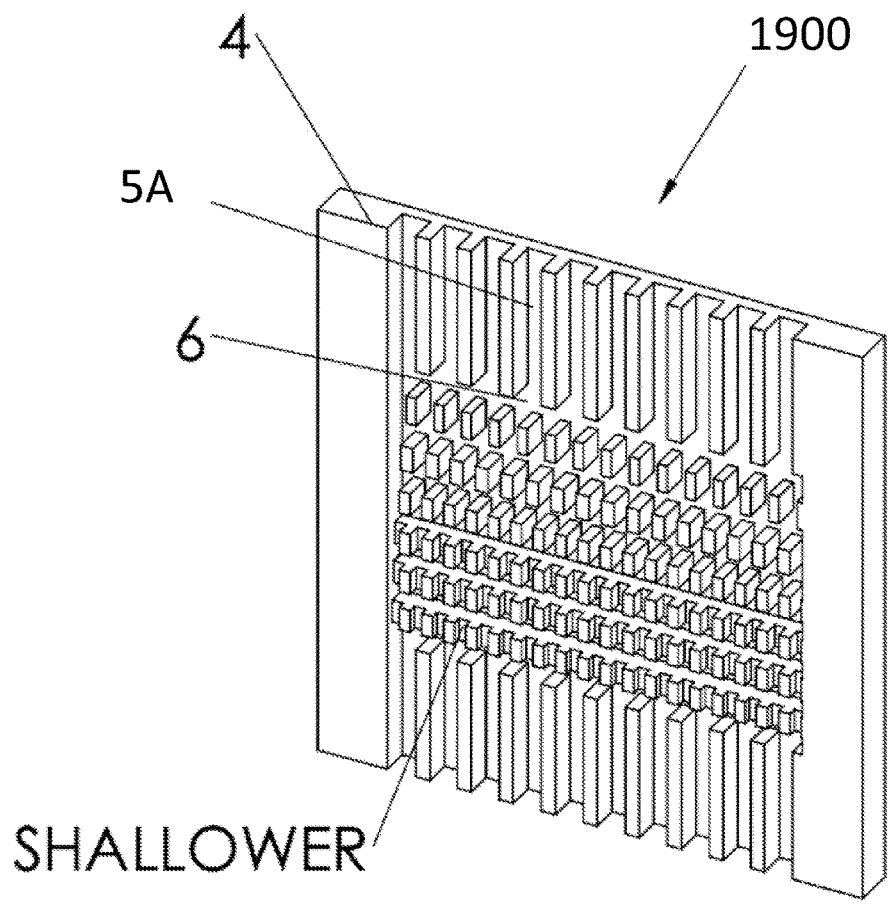
FIG. 19 is an isometric view of an alternate filter panel.
Figure 20:
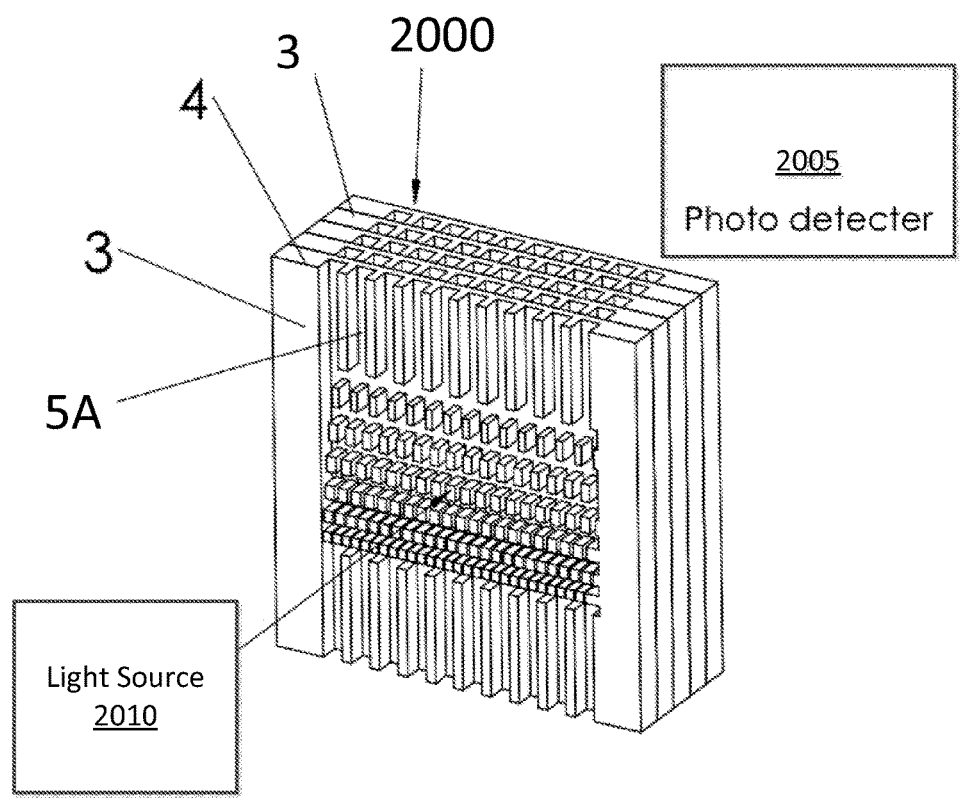
FIG. 20 is an isometric view of an alternate filter panel.

Referring to FIG. 19, some of the filter channels are shown to be shallower than other channels, while in FIG. 20 the filter is shown with a light source 2010 directed at the filter normal to the plane formed by the flow. Again, the filters 1900 and 200 also may each include features found in the panel of FIG. 1 such as an inlet 4, vertical protrusions 5A, and so forth. A photo detector 2005 is positioned on the opposite side of the filter. The light source and photo detector may be of one particular spectrum and may be UV, visible, IR or other wavelengths of the electromagnetic spectrum. This source/detector pair can be used to detect the presence of material and more important specific types of material at specific locations in the filter.

Figure 21:
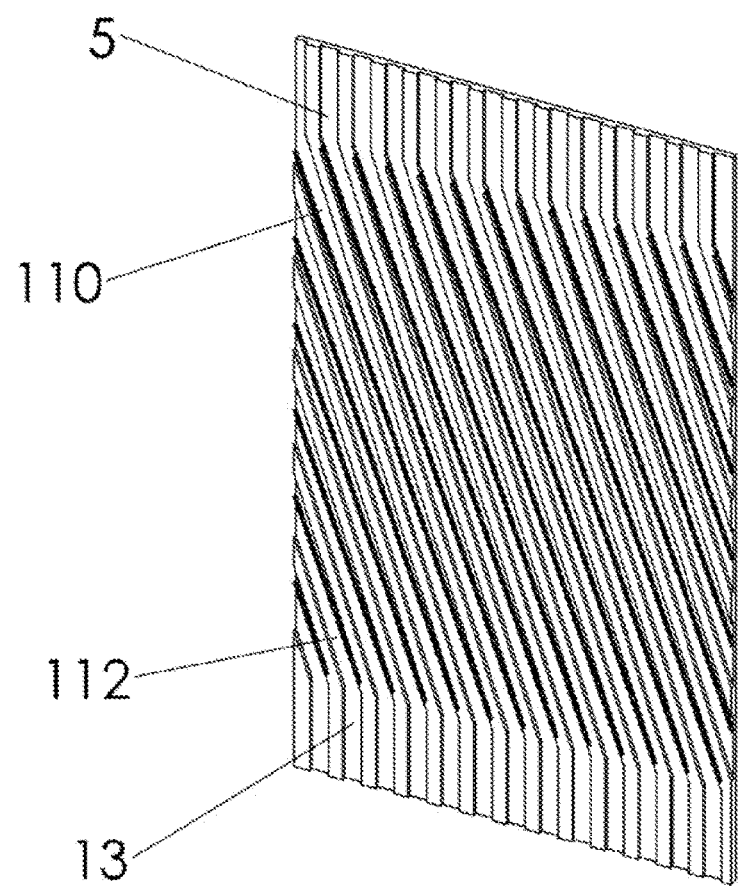
FIG. 21 is an isometric view of an alternate filter panel.
Figure 22:
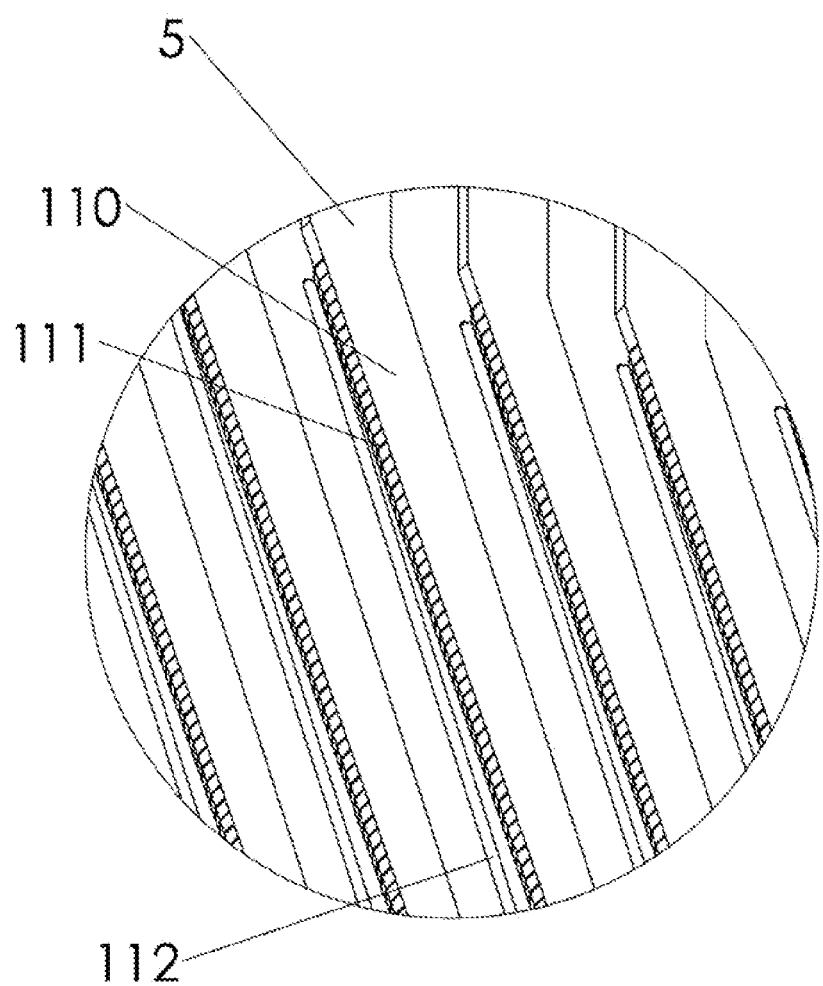
FIG. 22 is a close-up view of FIG. 21.
Figure 23:
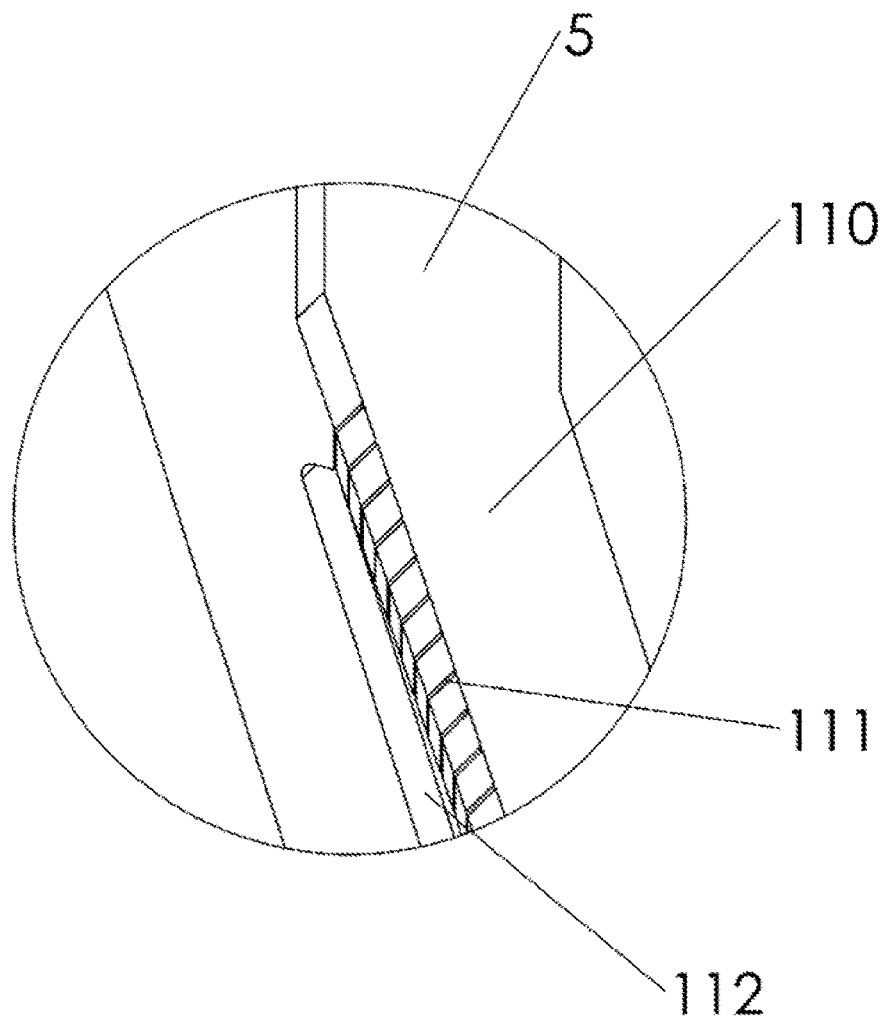
FIG. 23 is a close-up view of FIG. 22.

Referring to FIG. 21 and the close-up FIGS. 22 and 23, a preferred design of an air filter is shown. Referring to FIG. 23, the vertical channels 5 (formed by spaced apart vertically extending protrusions) feeds the angled channels 110. In some embodiments, the angled channels 110 extend downwards from the vertical channels 5 at approximately 30 degrees from vertical. The angled channels 110 feed the micro filter channels 111. Hundreds of the micro filter channels 111 are arranged along each of the angled channels 110. The fluid flows from the vertical channels 5 to the angled channels 110 and is filtered by the micro filter channels 111. The fluid exits the micro filter channels 111 to the angled exhaust channels 112. The angled exhaust channels 112 are disposed generally parallel with the angled filter channels 110. The fluid then flows from the angled exhaust filter channels 112 to the exit vertical channels 13.

Figure 24:
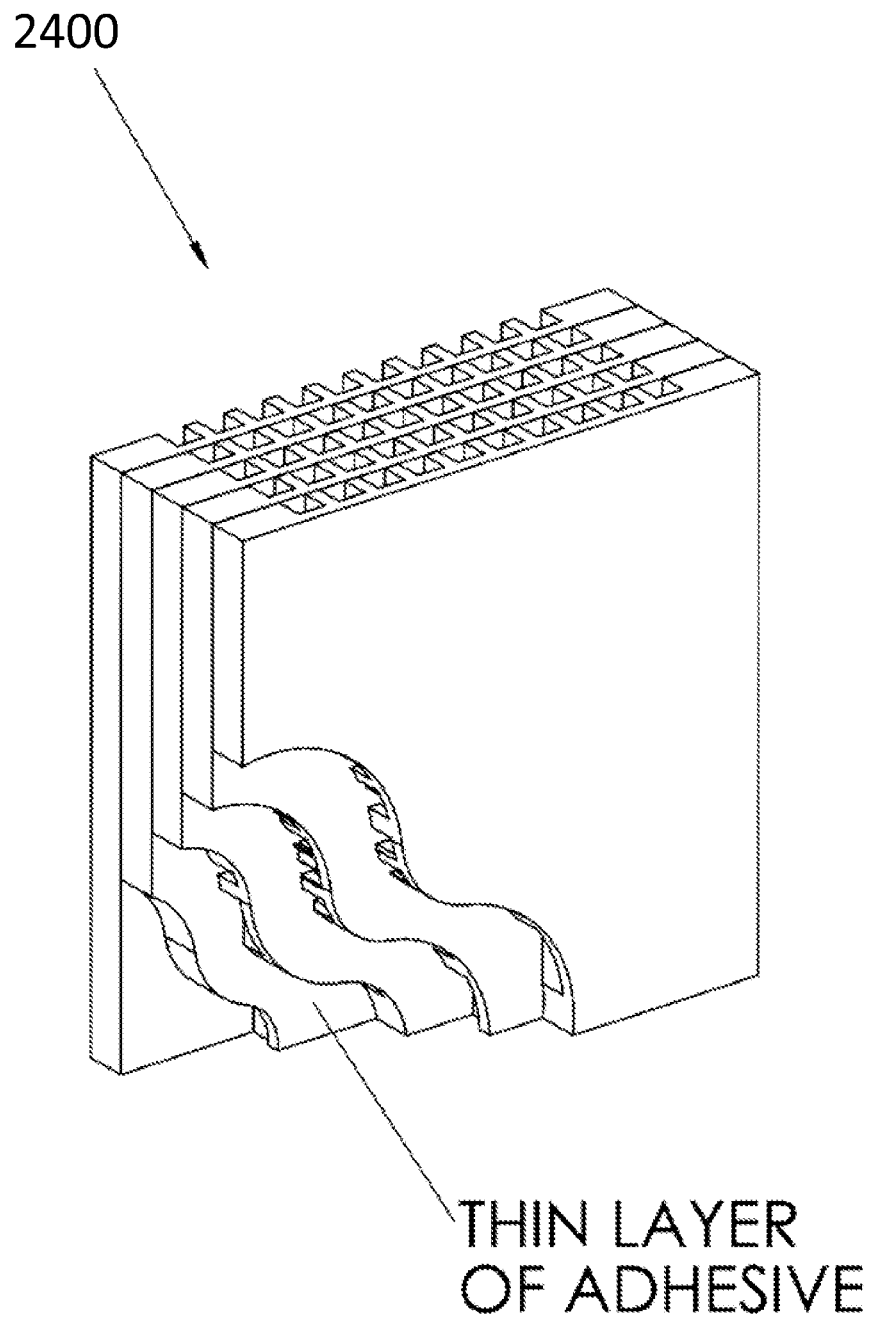
FIG. 24 is a back side cut away view of an alternate filter.

Referring to FIG. 24, the back side of the filter 2400 can be seen with some layer cut away. The layers between the filter panels are coated with an adhesive to ensure there are no gaps between the filter panels. This adhesive may be used with any of the configurations of filters or filter panels. A solvent or heat and pressure may also be used to ensure there are no gaps between the filter panels.

Figure 25:
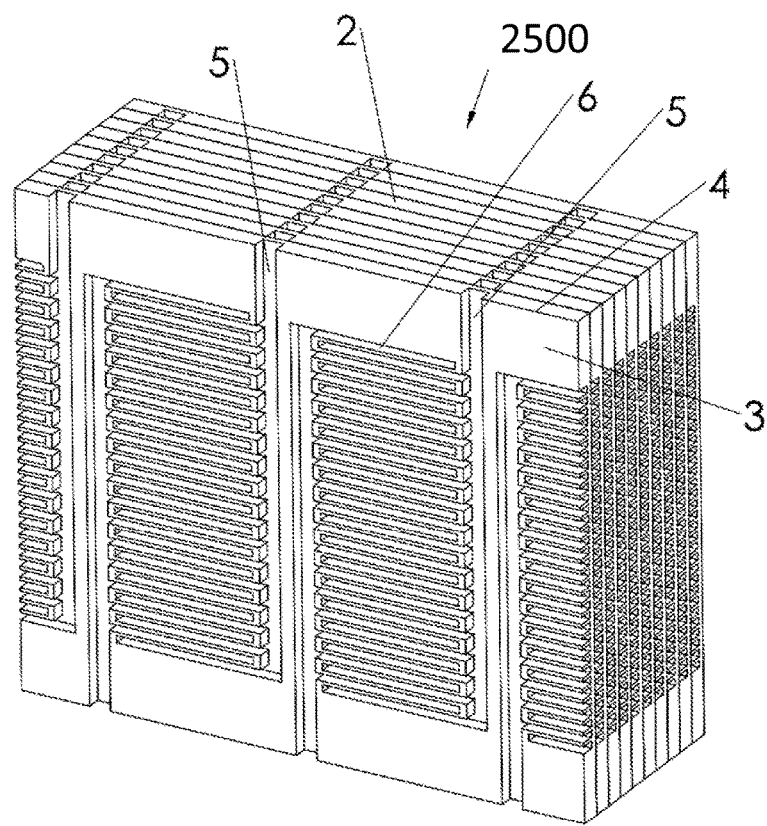
FIG. 25 is an isometric view of a section of the filter.

Referring first to FIG. 25, the filter 2500 is shown. Fluid or gas flows into the filter 1 from the top surface 2 of the filter 2500. The filter panels 3 are layered together where the top edge 4 of the filter panels 3 forms the top surface 2 of the filter 2500. The number of filter panels 3 layered together would be much greater than what is shown. The number of filter panels 3 may be in the hundreds or thousands. The width of the filter panels 3 would also typically be much greater than what is shown.

The vertical channels 5 in the filter panel 3 are arranged vertically along the horizontal length of the top edge 4 of the filter panel 3. The number of vertical channels 5 would generally be much greater than what is shown in the FIG. 25. In some embodiments there would be hundreds or thousands of the vertical channels 5. Typically all of the filter 2500 would be of the same pattern. Although, for different applications of the filter 2500, filter panels 3 having different patterns of rows of filtering protrusions may be layered together. For example, the panels of FIGS. 2, 6, 7, and 11-17 may be used in various combinations, although any panel configuration and combination illustrated in the collective drawings can also be utilized in accordance with the present technology.

Figure 26:
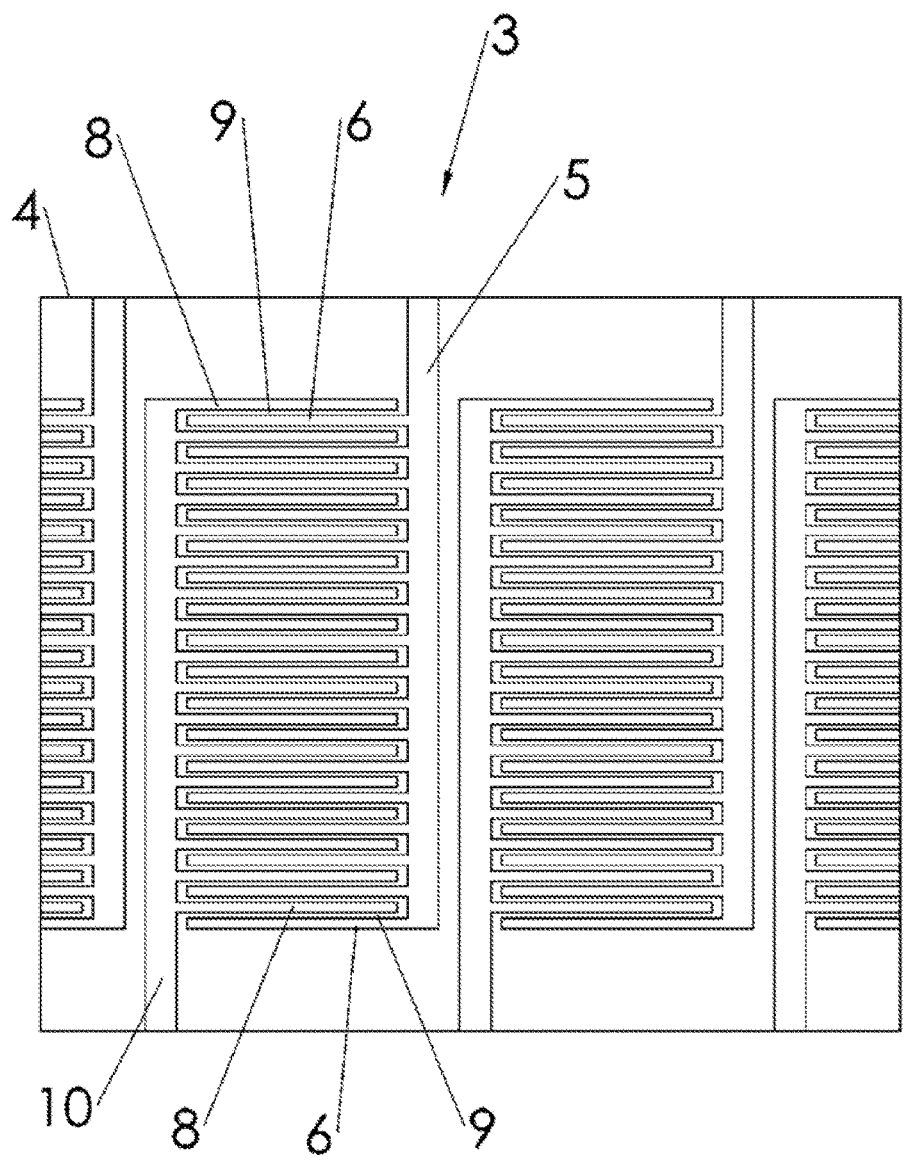
FIG. 26 is a front view of one panel of the filter.

Referring to FIG. 26, only one filter panel 3 is shown. The vertical channels 5 are generally equally spaced and the same size. The width of the vertical channels 5 would be larger than most of the particles being filtered. The vertical channels 5 might be one micron in width and 0.6 micron in depth. The horizontal spacing of the vertical channels 5 in the filter panel 3 might be ten microns. The entire thickness of the filter panel 3 might be one micron. It will be understood that the closer the thickness is to the depth of the channels the greater the overall density of the filter.

The height of the vertical channels 5 might be three microns. This relative large dimension allows for variations in the manufacturing process of the filter panel 3. For greater ease of manufacturing they might be taller. They may also be shorter if a more compact filter is desired.

The vertical channels 5 extend to near the bottom of the filter panel 3. The vertical channel 5 is connected to the inlet cross channel 6. The inlet cross channel 6 extends from the left side of the vertical channel 5 to the far right vertical channel 5. The height of the inlet cross channel 6 might be 0.3 microns and would preferably be the same depth as the vertical channels 5. There are a large number of inlet cross channels 6 that might be spaced at one micron.

All of the inlet cross channels 6 may be connected to the vertical channel 5. The inlet cross channels 6 would all be of similar length. Above the inlet cross channel 6 is the outlet cross channel 8. The cross channel dividing wall 9 separates the inlet cross channel 6 from the outlet cross channel 8. All of the outlet cross channels 8 are connected to the outlet vertical channel 10.

Figure 27:
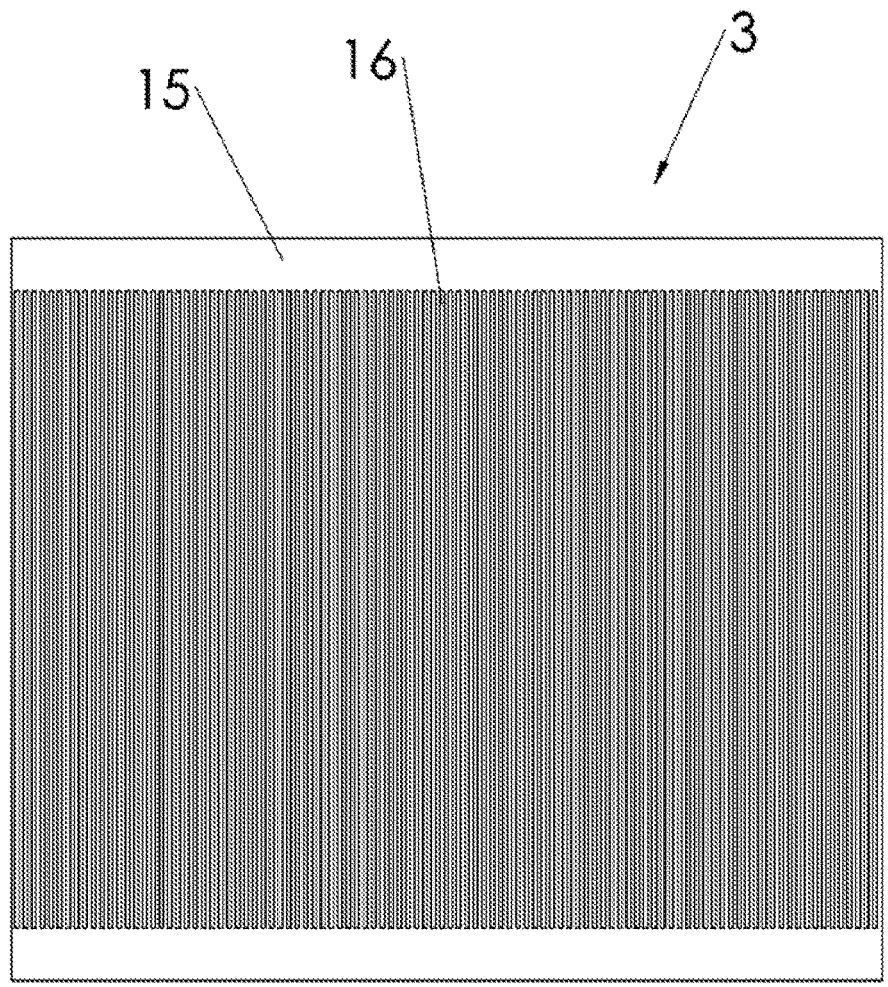
FIG. 27 is a back view of one panel of the filter shown in FIG. 26.

Referring to FIG. 27, where the back side of the filter panel 3 is shown. On the back side 15 of the filter panel there are shallow channels 16. The shallow channels 16 are shown to start at around two microns from the top of edge 4 of the filter panels 3, although the shallow channels 16 could begin at the top edge or much further down the filter panel 3.

In some embodiments, the shallow channels 16 may be extremely shallow in size, for example, only be 0.001 micron deep. Again, the depth of the channels would determine the size of the particle being filtered. The width of the shallow channels 16 might be 0.08 microns. It will be understood that this dimension does not control the size of the particle being filtered. To filter extremely small particles an extremely shallow channel is advantageous. It will be understood that with regard to manufacturing small features, it is preferable to create shallow channels as opposed to creating extremely narrow channels, although in some instances extremely narrow channels may be required and thus the filter may be manufactured with such channels.

The shallow channels 16 extend down to near the bottom edge of the filter panel and could as well extend to the bottom edge of the panel. In this embodiment, the shallow channels 16 are shown in a vertical orientation, although this orientation is not required. If the shallow channels 16 are oriented at, for example, 30 degrees from normal (e.g., parallel with the centerline of the filter), the vertical channels 5 and the outlet vertical channels 10 may be oriented at the same angle. In other words the shallow channels 16 may be parallel to the vertical channels.

Figure 28:
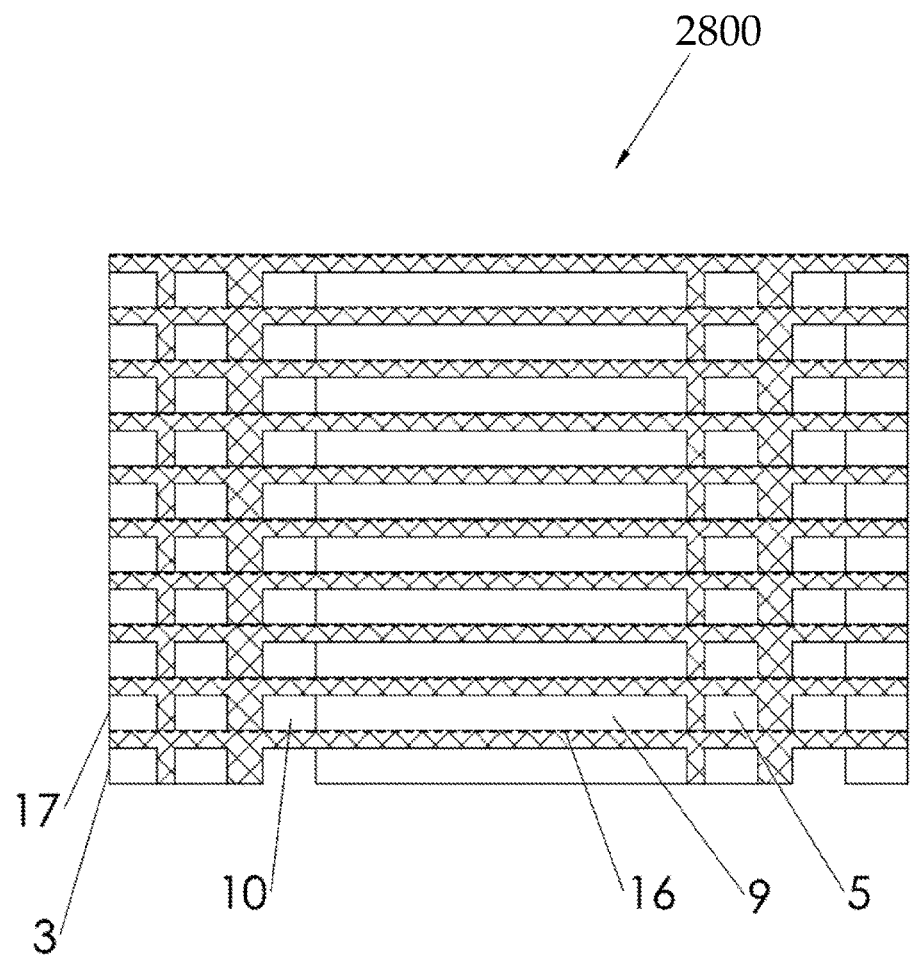
FIG. 28 is top section view of the filter.

Referring to FIG. 28 the relationship of the various channels of a filter 2800 can be seen in a top section view. The shallow channels 16 on the back side 15 of the filter panel 3 are connected to the cross channel dividing wall 9 of the second filter panel 17 situated behind the filter panel 3. This relationship allows fluid to flow from the inlet cross channels 6 to the outlet cross channels 8. The inlet cross channel 6 is positioned below the cross channel dividing wall 9 and the outlet cross channel 8 is above the cross channel dividing wall 9.

Figure 29:
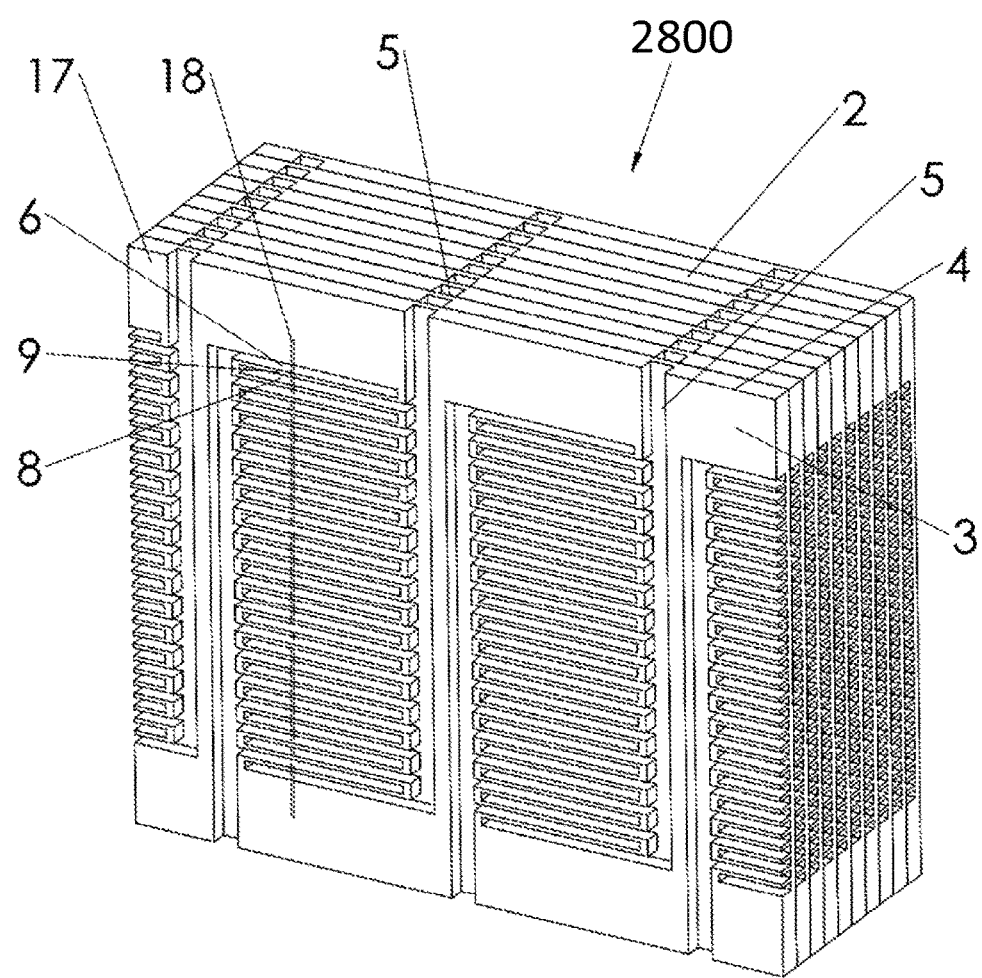
FIG. 29 is an isometric view of the filter.

Referring to FIG. 29, the dashed line, outline 18, is shown to illustrate the location of the shallow channel 16 from the adjoining panel as it contacts the filter panel 3.

It should be noted that plastic or polymeric material is the preferred material for the filter layers, although other materials could also be used such as composites, metals, glass, and ceramic—just to name a few. Both of these materials are not as easily molded as plastic materials, although they are typically more durable and can be operated at elevated temperatures. Ceramic and glass are typically not rolled into a tight spiral except when the thickness of the panel is much smaller than the bend radius. The disclosed film dimensions would allow for a glass or ceramic film to be bent into a spiral.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A substrate panel for filtering a fluid, the substrate panel, comprising:
    a filtering front surface and a flat back surface, the filtering front surface comprising:
    a first row of vertically extending cuboid protrusions spaced apart from one another to form elongated sidewalls that define vertical channels, the first row of vertically extending cuboid protrusions proximate an inlet of the substrate panel;
    a second row of vertically extending cuboid protrusions spaced apart from one another to form elongated sidewalls that define vertical channels, the second row of vertically extending cuboid protrusions proximate an exit of the substrate panel; and
    one or more additional rows of vertically extending protrusions, the one or more rows additional rows of vertically extending protrusions being spaced apart from one another and extending in between the first and second rows of vertically extending cuboid protrusions, but not within the vertical channels formed by the elongated sidewalls, the first row of vertically extending cuboid protrusions terminating above the one or more additional rows of vertically extending protrusions and the one or more additional rows of vertically extending protrusions terminating above the second row of vertically extending cuboid protrusions, the one or more additional rows of vertically extending protrusions each having a unique length, which is shorter in length than either a first row length of the first row of vertically extending cuboid protrusions or a second row length of the second row of vertically extending cuboid protrusions, each of the one or more additional rows of vertically extending protrusions comprising a specific polygonal cross sectional area and spacing between protrusions that are selected to filter particles of a particular size, wherein at least one of the one or more additional rows of filtering protrusions comprises filtering protrusions that are tapered to produce filter channels that are each narrower at an inlet end and larger at an outlet end to ensure that objects are trapped in the narrower inlet end.

2. The substrate panel according to claim 1, wherein the substrate panel is rolled onto itself to form a spiral that is layered such that at least a portion of the filtering front surface mates with the flat back surface.

3. The substrate panel according to claim 2, wherein the substrate panel is rolled into a cylindrical configuration.

4. The substrate panel according to claim 1, wherein the width and depth of each of the rows of vertically extending protrusions defines a filtering channel.

5. The substrate panel according to claim 1, wherein the one or more additional rows of vertically extending protrusions are vertically arranged between the first and second rows of vertically extending cuboid protrusions such that filter channels of the one or more additional rows of vertically extending protrusions are progressively smaller towards the exit of the filter.

6. The substrate panel according to claim 1, wherein vertically extending protrusions of adjacent rows are offset from one another.

7. The substrate panel according to claim 1, wherein one or more filtering protrusions of a row of the one or more additional rows of vertically extending protrusions comprises a filter groove that is configured to filter objects that are smaller in size than objects that are captured by the filter channels of the one or more additional rows of vertically extending protrusions.

8. The substrate panel according to claim 1, further comprising a separation wall disposed between adjacent rows of the one or more additional rows of vertically extending protrusions, wherein the separation wall directs fluid around a portion of the one or more additional rows of vertically extending protrusions.

9. The substrate panel according to claim 1, wherein any of the first row of vertically extending cuboid protrusions, the second row of vertically extending cuboid protrusions, or one or more additional rows of the vertically extending protrusions are square in shape.

10. The substrate panel according to claim 1, wherein at least one of the one or more additional rows of vertically extending protrusions have rounded edges of a given radius or fillets.

11. The substrate panel according to claim 1, wherein the first row of vertically extending cuboid protrusions have rounded edges of a given radius or fillets and the second row of vertically extending cuboid protrusions have rounded edges of a given radius or fillets.

12. The substrate panel according to claim 1, further comprising one or more coating layers disposed between adjacent rows of filtering protrusions.

13. The substrate panel according to claim 1, wherein the one or more coating layers are hydrophobic, dipole-dipole, ionic, or combinations thereof.

14. The substrate panel according to claim 1, wherein at least a portion of the filtering front surface is electrically charged.

15. The substrate panel according to claim 1, wherein the one or more additional rows of vertically extending filtering protrusions are disposed at an angle relative to either or both of the first and second rows of vertically extending cuboid protrusions.

* * * * *